United States Patent [19]

Miyata et al.

[11] Patent Number: 5,323,387

[45] Date of Patent: Jun. 21, 1994

[54] DATA TRANSMISSION APPARATUS

[75] Inventors: Souichi Miyata, Nara; Tsuyoshi Muramatsu, Chiba, both of Japan

[73] Assignee: Sharp Kabushiki Kaisha, Osaka, Japan

[21] Appl. No.: 497,221

[22] Filed: Mar. 22, 1990

[30] Foreign Application Priority Data

| Mar. 23, 1989 | [JP] | Japan | 1-73498 |
| Mar. 23, 1989 | [JP] | Japan | 1-73499 |
| Mar. 31, 1989 | [JP] | Japan | 1-82557 |
| Nov. 21, 1989 | [JP] | Japan | 1-304501 |

[51] Int. Cl.$^5$ .................................... H04L 12/56
[52] U.S. Cl. ................... 370/60; 370/94.1; 340/825.02; 340/825.52
[58] Field of Search ............. 370/60, 61, 85.6, 94.1, 370/112, 56, 94.2, 94.3; 340/825.02, 825.52

[56] References Cited

U.S. PATENT DOCUMENTS

| 4,811,337 | 3/1989 | Hart | 340/825.02 |
| 4,935,922 | 6/1990 | Wicklund et al. | 370/60 |
| 4,985,890 | 1/1991 | Matsumoto et al. | 370/94.1 |
| 5,008,880 | 4/1991 | Azuma | 370/85.6 |

*Primary Examiner*—Douglas W. Olms
*Assistant Examiner*—Hassan Kizou

[57] ABSTRACT

A data transmission apparatus includes one input-side transmission path and a plurality of output-side transmission paths. The input-side transmission path includes a plurality of handshaking-type data transmission paths provided in series. Each of the output-side transmission paths includes a plurality of handshaking-type data transmission paths provided in series. Data to be transmitted includes an identifier for designation any or all of the plurality of output-side transmission paths. A comparison and determination logic portion determines whether the identifier included in the data designates any of the plurality of output-side transmission paths or all of them. A control portion sends the data supplied from the input-side transmission path to any or all of the plurality of output-side transmission paths, in response to a signal outputted from the comparison and determination logic portion.

23 Claims, 25 Drawing Sheets

DATA TRANSMISSION APPARATUS

CROSS-REFERENCE TO RELATED APPLICATION

The present application is related to copending applications Ser. No. 259,850, filed Oct. 19, 1989; No. 260,068, filed Oct. 20, 1988 now U.S. Pat. No. 4,985,900 issued Jan. 15, 1991; and No. 323,021, filed Mar. 14, 1989 now U.S. Pat. No. 5,008,880 issued Apr. 16, 1991, commonly assigned with the present invention.

BACKGROUND OF THE INVENTION

1. Field of the Invention

The present invention relates generally to data transmission apparatuses, and more particularly, to data transmission apparatuses autonomously and selectively transmitting data supplied from a preceding stage. The data is supplied at an arbitrary time interval or data having a plurality of words to any of a plurality of parallel succeeding stage portions. Interface apparatus is used for controlling data transmission from a first apparatus to one or a plurality of second apparatuses, and to data transmission apparatuses for serially sending out data transmitted in parallel.

2. Description of the Background Art

In a processor such as an electronic computer, a plurality of processing units are coupled in communication by digital signals. A plurality of data processings are performed by a plurality of processing units in a distributed manner. In this case, the contents of the data processing in each of the processing units is different, and data required for each data processing and the obtained results are also different. In such a processor, if a plurality of processings requiring the data to be sent and received are coupled by interconnections for every processing and input/output ports are provided in the respective processing units, the hardware becomes very complicated and makes the apparatus large in scale, thereby increasing the cost for manufacturing the same.

The inventors of the present invention proposed, in Japanese Patent Laying Open No. 62-174857, a data transmission apparatus capable of transmitting different types of groups of data through the same data transmission path.

FIG. 1 is a schematic block diagram of the above described proposed data transmission apparatus.

First, referring to FIG. 1, a brief description will be made on a data transmission apparatus for transmitting data through two divided transmission paths.

In FIG. 1, each of data transmission paths 1, 7, and is comprised of a data register for holding data and a transfer control portion. An identifier transmission path 2 is provided in parallel with the data transmission path 1. The identifier transmission path 2 transmits an identifier called "tag". The identifier indicates to the data transmission path 7 or 8 whether the data transmitted to the data transmission path 1 should be sent.

When both of the data transmission paths 7 and 8 are empty to allow data transmission, UK signals 5a and 6a are supplied to control portions 5 and 6 from the data transmission paths 7 and 8, respectively. Similarly, UL signals 5d and 6d from data transmission paths (not shown) in stages subsequent to the data transmission paths 7 and 8 are supplied to the control portions 5 and 6, respectively. The UL signals 5d and 6d are supplied from arbitrary data transmission paths in the stages subsequent to the data transmission paths 7 and 8 and indicate that the data transmission paths in the succeeding stage are empty to allow the data transmission therethrough. Control portions 5 and 6, when the UK signal 5a, the UL 5d, the UK signal 6a and the UL signal 6d are respectively supplied, determine that the data transmission path 7 and the data transmission path in the succeeding stage, and the data transmission path 8 and the data transmission path in the succeeding stage are empty. Control portions 5 and 6, if they have held the data until that time, transfer the data to the data transmission paths in the succeeding stage and enter an enabling state which allows the control for branching the succeeding data.

An NOR gate 4, on receiving from the control portions and 6 determination signals 5b and 6b indicating that both of the control portions are empty and enabled, supplies an AK signal to the data transmission path 1 and the identifier transmission path 2.

As described, the UK signals and the UL signals from the data transmission paths 7 and 8 and the data transmission paths in the succeeding stages authorize or inhibit data transmission from the control portions 5 and 6 to the data transmission paths 7 and 8, and also authorize or inhibit data to be branched and transmitted from the data transmission path 1 to the control portion 5 or 6, depending on whether the succeeding stages are empty or not.

For example, an identifier indicating that the data transmitted to the data transmission path 1 is to be transmitted to the data transmission path 7 is supplied from the identifier transmission path 2 to an identifier decoding portion 3. The identifier decoding portion 3 decodes the identifier received from the identifier transmission path 2, supplies a control signal 5c to the control portion 5. As a result, this allows the data transmitted from the data transmission path 1 to be transmitted to the data transmission path 7 through the control portion 5.

On the contrary, when an identifier indicating that the data is to be transmitted to the data transmission path 8 is supplied from the identifier transmission path 2 to the identifier decoding portion 3, the identifier decoding portion 3 supplies a control signal 6c to the control portion 6 and enables the same. As a result, this allows the data transmitted to the data transmission path to be transmitted to the data transmission path 8 through the control portion 6.

If, out of the data transmission paths 7 and 8 and the data transmission paths in the succeeding stages, for example, the data transmission path 7 holds the data or is transmitting the data, the UK signal 5a is not supplied to the control portion 5. Similarly, when the data transmission path in the stage subsequent to the data transmission path 7 holds the data or is transmitting the same, the UL signal 5d is not supplied to the control portion 5. Therefore, the control portion 5 determines that the data transmission path 7 or the data transmission paths in the succeeding stage is transmitting the data or busy. As a result, the control portion 5 stores the data inputted in a register (not shown) included therein and supplies a signal of a "H" (logical high) level to one input terminal of the NOR gate 4. This causes the NOR gate 4 to be closed and consequently the AK signal is supplied neither to the data transmission path 1 nor to the identifier transmission path 2.

In the event any of the data transmission paths 7 and 8 and the data transmission paths in the succeeding stages holds the data or is transmitting the same and furthermore the control portions 5 and 6 hold the data, the data transmitted to the data transmission path 1 is inputted to neither of the control portions 5 and 6 but held in the data transmission path 1.

However, when the data transmission path 7 and the data transmission path in the succeeding stage or the data transmission path 8 and the data transmission path in the succeeding stage, and the control portion 5 or 6 finish transmitting the data to change from a busy state to a ready state, the control portion 5 or 6 is enabled. As a result, it is possible to autonomously branch the data held in the data transmission path 1 in accordance with the identifier again.

In the above described data transmission apparatus, the data supplied from the preceding stage can be sent to any one of a plurality of parallel units provided succeeding stage portions, the data supplied from the preceding stage portion can not be sent to all the plurality of parallel provided succeeding stage portions.

Secondly, in case the data to be transmitted comprises a plurality of words and an arbitrary word of the plurality of words includes an identifier for a branch destination, it is not possible to autonomously and selectively send out the data comprising the plurality of words to any of the plurality of parallel provided succeeding stage portions.

In addition, a handshaking type data transfer is known as data transmission in an information processor or the like. For example, data transmission from a first data transmission path to a second data transmission path in accordance with the handshaking type data transmission is performed as follows.

Transmission signals are supplied from the first data transmission path to the second data transmission path and transmission acknowledging signals are supplied from the second data transmission path to the first data transmission path. First, data is supplied from the first data transmission path to the second data transmission path, together with the transmission signals. The second data transmission path, in response to the transmission signals, makes the transmission acknowledging signals being inhibited in order to inhibit additional data sending for a fixed time period. After a lapse of the fixed time period, when the transmission acknowledging signals return to the authorized state, data transmission from the first data transmission path to the second data transmission path is again authorized. Thus, the handshaking type data transmission is performed in an information processor or between a plurality of information processors.

In case of the data transmission between a plurality of apparatuses, long signal lines for connecting the apparatuses cause delay in signal transmission. As a result, some time period is required until the first apparatus receives a signal inhibiting additional data sending after the data is supplied from the first apparatus to the second apparatus together with the transmission signals. Therefore, before the second apparatus finishes data transmission, additional data is sent out from the first apparatus to the second apparatus.

Furthermore, in case of the data transmission from one apparatus to a plurality of apparatuses, if interconnection paths connected between the apparatuses differ in length, every interconnection path differs in a signal delay time. Therefore, in order to adjust timing skews of signals in the plurality of interconnection paths, there is a need for providing a delay circuit comprising a gate element or a delay circuit comprising a resistor and a capacitance element on each path.

Since the interconnection paths between the apparatuses are always changed in accordance with an arrangement for a packing of a plurality of apparatuses, such skew adjustment as described above is required in accordance with a packing form of the plurality of apparatuses.

Time periods required for processing data in the respective plurality of processing units differ depending on received data and the contents of processing required of the processing units. In addition, groups of data processed in the respective processing units are not always transmitted in the same order and at the same time intervals. Therefore, there can occur stay of a group of data due to difference in processing time in each processing unit. If a transmission path itself can have a buffer function of decreasing such stay of the group of data to the utmost, it is possible to decrease the amount of hardware of the data processing apparatus.

SUMMARY OF THE INVENTION

An object of the present invention is to provide a data transmission apparatus capable of transmitting a plurality of different types of data groups through the same data transmission path and autonomously and selectively transmitting data supplied from a preceding stage portion to any or all of a plurality of parallel provided succeeding stage portions.

Another object of the present invention is to provide a data transmission apparatus capable of transmitting a plurality of different types of data groups through the same data transmission path, and even when an arbitrary word in data comprising a plurality of words supplied from a preceding stage portion includes an identifier for designating branch destination, capable of autonomously and selectively transmitting the data comprising the plurality of words to any of a plurality of parallel provided succeeding stage portions.

A further object of the present invention is to provide an interface apparatus capable of autonomously adjusting timing skew caused due to signal delay in interconnection path between apparatuses.

Still another object of the present invention is to provide a data transmission apparatus capable of transmitting data transmitted through a plurality of parallely provided input-side transmission paths to an output-side transmission path in the order of arrival even if they arrive at short time intervals.

The data transmission apparatus according to the present invention is a data transmission apparatus sending data supplied from a preceding stage portion to a plurality of succeeding stage portions provided in parallel and it comprises a determination portion and a control portion.

The data transmitted by this data transmission apparatus includes an identifier for designating any or all of a plurality of succeeding stage portions. The determination portion determines whether the identifier included in the data supplied from the preceding stage portion designates any or all of the plurality of succeeding stage portions and outputs signals indicating the determination result. The control portion sends the data supplied from the preceding stage portion to any or all of the plurality of succeeding stage portions, in response to the signal from the determination portion.

In the data transmission apparatus, it is determined whether the identifier included in the data provided from the preceding stage portion designates any or all of the plurality of succeeding stage portions. Based on the determination result, the data provided from the preceding stage portion is transmitted to any or all of the plurality of succeeding stage portions.

Accordingly, even if different types of data is inputted at arbitrary time intervals, each data can be transmitted autonomously and selectively to a desired succeeding stage portion or all of the succeeding stage portions. Therefore, there is no need to provide highly functional input/output ports and additional interconnections for every type of data.

In addition, it becomes possible to receive the data to the limit of physical capacity of transmission path and to sequentially transmit the received data to any or all of the plurality of succeeding stage portions without delay time for transmission. Accordingly, a highly reliable data transmission apparatus operating at a high speed can be achieved at a reasonable cost.

A data transmission apparatus according to another aspect of the present invention is a data transmission apparatus for transmitting data comprising a plurality of words which is provided from a preceding stage portion to any of a plurality of succeeding stage portions provided in parallel and the apparatus comprises a plurality of determination portions and control portions.

Any of the plurality of words in the data transmitted by this data transmission apparatus includes an identifier for designating any of the plurality of succeeding stage portions. The plurality of determination portions are provided corresponding to the plurality of words. Each of the plurality of determination portions determines a succeeding stage portion designated by the identifier included in the corresponding word and outputs a signal indicating the determination result. The control portions sequentially transmit the plurality of words included in the data provided from the preceding stage portion to any of the plurality of the succeeding stage portions, in response to the signal from the determination portion.

In this data transmission apparatus, a succeeding stage portion designated by an identifier included in any of the plurality of words in the data provided from the preceding stage portion is determined by the corresponding determination portion. Based on the determination result by the determination portion, the data comprising the plurality of words provided from the preceding stage portion is transmitted to any of the plurality of succeeding stage portions.

Accordingly, whichever word of the plurality of words includes an identifier, the data comprising the plurality of words can be transmitted autonomously and selectively to a desired succeeding stage portion. In addition, even if different types of data each comprising a plurality of words is inputted at arbitrary time intervals, each data can be transmitted autonomously an selectively to a desired succeeding stage portion. Therefore, there is no need to provide input/output ports and additional interconnections for every type of data. Various types of data each including an identifier in an arbitrary word can be transmitted by one data transmission apparatus, resulting in reduction of the manufacturing cost. Accordingly, a highly reliable data transmission apparatus operating at a high speed can be achieved at a reasonable cost.

An interface apparatus according to a still further aspect of the present invention is an interface apparatus for controlling data transmission from a first apparatus to one or a plurality of second apparatuses. The apparatus included a transmission inhibiting signal generation portion and a transmission acknowledging signal generation portion. The first apparatus outputs a transmission signal when sending the data to the one or the plurality of second apparatuses. Each of the one or the plurality of second apparatuses output a reception completing signal when it completes data reception from the first apparatus. The transmission inhibiting signal generating portion supplies to the first apparatus a transmission signal for inhibiting additional data transmission, in response to the transmission signal from the first apparatus. The transmission acknowledging signal generation portion supplies to the first apparatus the transmission acknowledging signal for acknowledging additional data transmission, in place of the transmission inhibiting signal, in response to a reception completing signal which is generated at the latest time point, (e.g., last) out of the reception completing signals from the one or the plurality of second apparatuses.

According to the interface apparatus, the transmission inhibiting signal generation portion supplies a transmission inhibiting signal to the first apparatus, in response to a transmission signal from the first apparatus. As a result, the first apparatus is inhibited from sending additional data to one or a plurality of second apparatuses. The transmission acknowledging signal generation portion supplies a transmission acknowledging signal to the first apparatus, in response to a reception completing signal generated at the latest from one or the plurality of second apparatuses. As a result, the second apparatuses enter a state in which they can receive additional data. Accordingly, it becomes possible to autonomously adjust timing skew of the signals on the interconnection paths, between the first apparatus and one or the plurality of second apparatuses.

Accordingly, highly reliable data transmission between a plurality of apparatuses can be achieved at a reasonable cost.

A data transmission apparatus according to a still further aspect of the present invention is a data transmission apparatus for sending in series a plurality of data supplied in parallel from a preceding stage portion to a succeeding stage portion and the apparatus comprises a plurality of first data transmission paths, a second data transmission path, a control portion and a conflict avoiding portion. Each of the plurality of first data transmission paths receives the plurality of data supplied in parallel from the preceding stage portion and generates a transmission requiring signal indicating arrival of the data. The second data transmission path generates a transmission acknowledging signal indicating that the data can be received and selectively receives the data from any one of the plurality of first data transmission paths. The control portion, in response to the transmission requiring signal generated from any of the plurality of first data transmission paths and the transmission acknowledging signal generated from the second data transmission path, transmits the data arriving at the plurality of first data transmission paths to the second data transmission paths in the order of the arrival. The conflict avoiding portion sets a time difference larger than a predetermined time difference, between timing for inputting a transmission requiring signal from one of the plurality of first data transmission paths to the control portion and timing for inputting a transmission requiring signal from the other of the plurality of the first data transmission paths subsequent thereto to the control portion.

If the data arrives at one and the other of the first data transmission paths at slightly different timings, an output of the control portion might becomes logically unsettled. However, in the data transmission apparatus, conflict timing of the transmission requiring signals at which the output of the control portion becomes logically unsettled can be avoided by providing the conflict avoiding portion. Accordingly, even if the plurality of pieces of data transmitted in parallel conflict with each other to arrive at the plurality of first data transmission paths, it is assured that the data is transmitted to the second data transmission path on a first-come first-serve basis without fail. As a result, the present invention can be applied without condition to an applied field wherein even if a plurality of data are inputted in parallel at slightly different timings, it is adjusted so that the data is outputted in the order of the arrival, maintaining the order of data input strictly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the drawings hereinafter.

Figure 2:
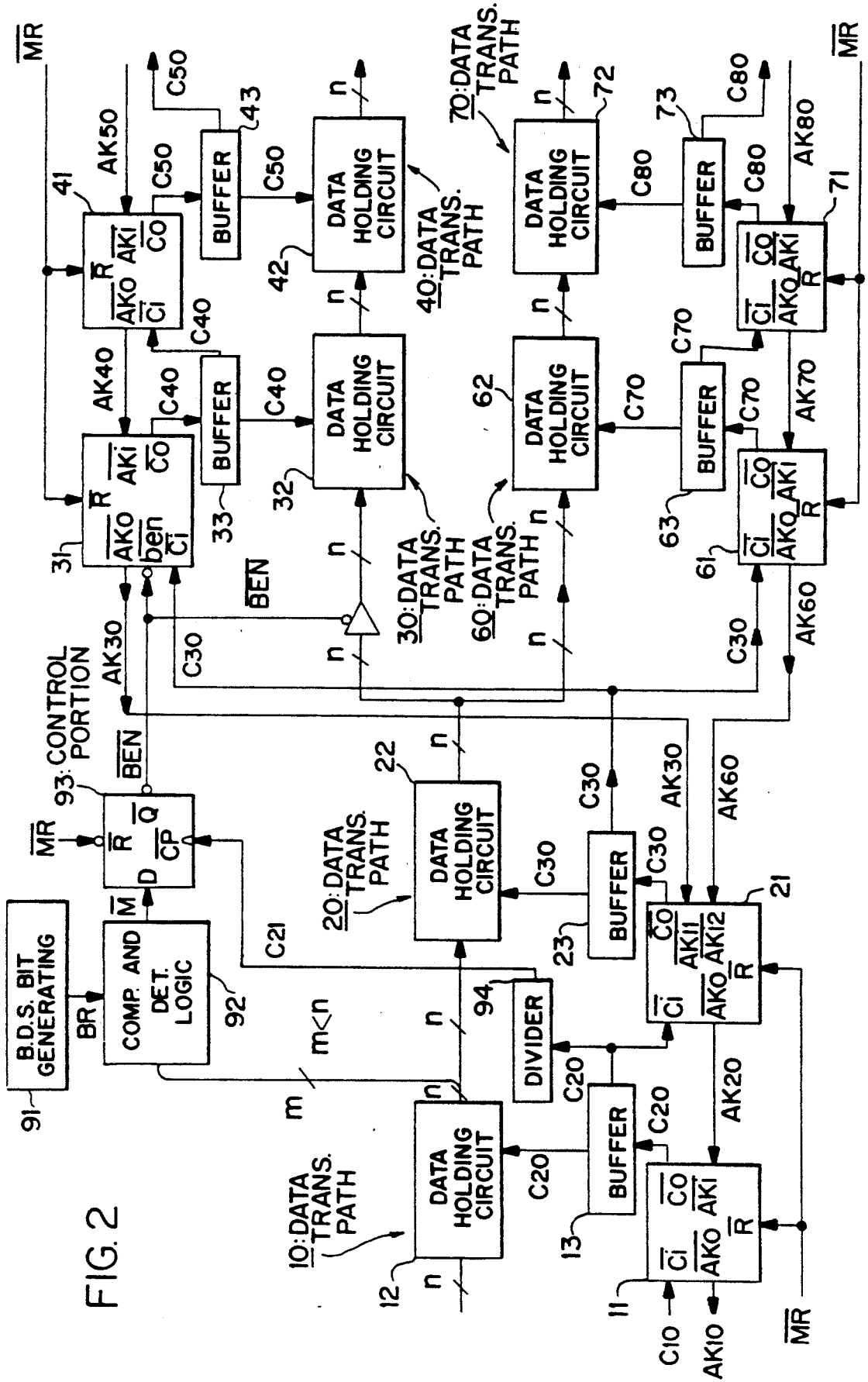
FIG. 2 is a block diagram showing a structure of a data transmission apparatus according to a first embodiment of the present invention.

FIG. 2 is a block diagram showing a structure of a data transmission apparatus according to a first embodiment of the present invention.

In FIG. 2, data transmission paths 10 and 20 constitute an input-side transmission path. The data transmission path 10 comprises a transfer control portion 11, a data holding circuit 12 and a buffer 13. The data transmission path 20 comprises a transfer control portion 21, a data holding circuit 22 and a buffer 23. In addition, provided in parallel are an output-side transmission path comprising data transmission paths 30 and 40 and an output-side data transmission path comprising data transmission paths 60 and 70. The data transmission path 30 comprises a transfer control portion 31, a data holding circuit 32 and a buffer 33. Similarly, the data transmission path 40 comprises a transfer control portion 41, a data holding circuit 42 and a buffer 43, the data transmission path 60 comprises a transfer control portion 61, a data holding circuit 62 and a buffer 63, and the data transmission path 70 comprises a transfer control portion 71, a data holding circuit 72 and a buffer 73.

The data supplied to the data holding circuit 12 from the preceding stage portion is transmitted to the data holding circuit 22. The data received by the data holding circuit 22 is transmitted to the data holding circuit 62 only or to both of the data holding circuits 32 and 62.

Figure 3:
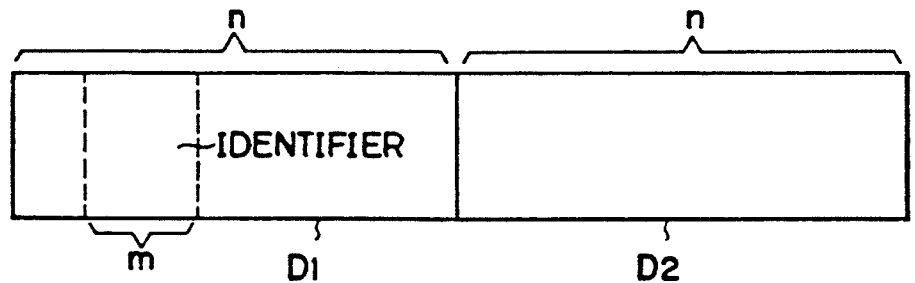
FIG. 3 is a diagram showing a structure of packet data transmitted in the data transmission apparatus of FIG. 2.

The data transmitted through the data transmission paths in the present embodiment is packet data comprising a first word D1 of n bits and a second word D2 of n bits, as shown in FIG. 3. The first word D1 of the packet data includes an identifier of m bits. The identifier indicates whether the packet data should be sent only to the data transmission path 60 or to both of the data transmission paths 30 and 60. The first word D1 and the second word D2 are successively transmitted.

The data transmission apparatus of FIG. 2 is further provided with a branch destination specifying bit generating portion 91, a comparison and determination of logic portion 92 including a comparator, a control portion 93 comprising a D type flip-flop, a divider 94 comprising a D type flip-flop and a buffer 95.

The transfer control portion 11 receives a transmission signal C10 from a preceding stage portion (not shown). In response to a fall of the transmission signal C10, the first word D1 of the packet data is supplied to the data holding circuit 12 from the preceding stage portion. The transfer control portion 11 supplies a transmission acknowledging signal AK10 of the "L" (logical low) level to the preceding stage portion. The transmission acknowledging signal AK10 of the "L" level indicates that transmission is being inhibited. When a transmission acknowledging signal AK20 of a "H" (logical high) level is supplied from the transfer control portion 21, the transfer control portion 11 supplies a transmission signal C20 of the "L" level to the data holding circuit 12 and the transfer control portion 21 through the buffer 13. The data transmission acknowledging signal AK20 of the "H" level indicates that transmission is being authorized. The data holding circuit 12, in response to a fall of the transmission signal C20, latches a first word D1 of the packet data supplied from the preceding stage portion and outputs the same.

The branch destination specifying bit generating portion 91 is previously set to generate a predetermined branch destination specifying bit BR. The comparison and determination logic portion 92 compares an identifier included in the first word D1 of the packet data outputted from the data holding circuit 12 with the branch destination specifying bit BR supplied from the branch destination specifying bit generating portion 91 and when they are coincident with each other, the portion 92 outputs a match signal $\overline{M}$ of the "L" level and when they are not coincident, it outputs a match signal $\overline{M}$ of the "H" level. The match signal $\overline{M}$ is supplied to an input terminal D of the control portion 93.

The divider 94 frequency-divides the transmission signal C20 supplied from the transfer control portion 11 through the buffer 13 by two and supplies the divided signals as clock signals C21 to a clock terminal $\overline{CP}$ of the control portion 93. The clock signal C21 falls once every time the transmission signal C20 from the transfer control portion 11 falls twice. More specifically, the clock signal C21 falls to the "L" level from the "H" level every time two words pass through the data holding circuit 12. The control portion 93, in response to the fall of the clock signal C21, outputs an inversion of the match signal $\overline{M}$ supplied to the input terminal D as a control signal $\overline{BEN}$ from an inversion output terminal $\overline{Q}$.

When the control signal $\overline{BEN}$ is at the "H" level, the buffer 95 becomes non-conductive and the transfer control portion 31 becomes inactive. On the contrary, when the control signal $\overline{BEN}$ is at the "L" level, the buffer 95 becomes conductive and the transfer control portion 31 becomes active. Namely, if the identifier included in the first word D1 of the packet data coincides with the branch destination specifying bit BR, the data holding circuit 22 is connected only with the data holding circuit 62. On the contrary, in case the identifier included in the first word D1 of the packet data does not coincide with the branch destination specifying bit BR, the data holding circuit 22 is connected to both of the data holding circuit 32 and the data holding circuit 62. In the initial state, when a master reset signal $\overline{MR}$ of the "L" level is supplied to a reset terminal $\overline{R}$ of the control portion 93, the control signal $\overline{BEN}$ attains the "L" level. Accordingly, in the initial state, the data holding circuit 22 is connected only to the data holding circuit 62.

The transfer control portion 21, when supplied with a transmission acknowledging signal AK30 of the "H" level from the transfer control portion 31 and a transmission acknowledging signal AK60 of the "H" level from the transfer control portion 61, supplies a transmission signal C30 of the "L" level to the data holding circuit 22 and the transfer control portions 31 and 61 through the buffer 23, in response to the fall of the transmission signal C20. The data holding circuit 22, in response to a fall of the transmission signal C30, latches the first word D1 of the packet data supplied from the data holding circuit 12 and outputs the same. Subsequently to the first word D1, a second word D2 of the packet data is similarly latched in the data holding circuit 12 and outputted therefrom.

When the control signal $\overline{BEN}$ is at the "H" level, a first word D1 of the packet data outputted from the data holding circuit 22 is supplied only to the data holding circuit 62. This is called "branch". The transfer control portion 61, in response to the fall of the transmission signal C30, supplies a transmission signal C70 of the "L" level to the data holding circuit 62 and the transfer control portion 71 through the buffer 63. The data holding circuit 62, in response to a fall of the transmission signal C70, latches the first word D1 of the packet data supplied from the data holding circuit 22 and outputs the same. The second word D2 of the packet data is similarly latched in the data holding circuit 22 and outputted therefrom. On this occasion, the control signal $\overline{BEN}$ is held at the "H" level, so that a second word D2 of the packet data outputted from the data holding circuit 22 is supplied only to the data holding circuit 62. The first word D1 of the packet data outputted from the data holding circuit 62 is similarly latched in the data holding circuit 72 and outputted therefrom. In addition, the second word D2 of the packet data outputted from the data holding circuit 22 is similarly latched in the data holding circuit 62 and outputted therefrom.

On the contrary, in case the control signal $\overline{BEN}$ outputted from the control portion 93 is at the "L" level, the first word D1 of the packet data outputted from the data holding circuit 22 is supplied to both the data holding circuits 32 and 62. This is called "shunt". A first word D1 of the packet data supplied to the data holding circuit 32 is latched in the data holding circuit 32 and outputted therefrom and thereafter latched in the data holding circuit 32 and outputted therefrom. Similarly, a first word D1 of the packet data supplied to the data holding circuit 62 is latched in the data holding circuit 62 and outputted therefrom and thereafter latched in the data holding circuit 72 and outputted therefrom. A second word D2 of the packet data is similarly supplied to the data holding circuits 32 and 62 through the data holding circuit 22 and thereafter supplied to the data holding circuit 42 and the data holding circuit 72, respectively.

Figure 4:
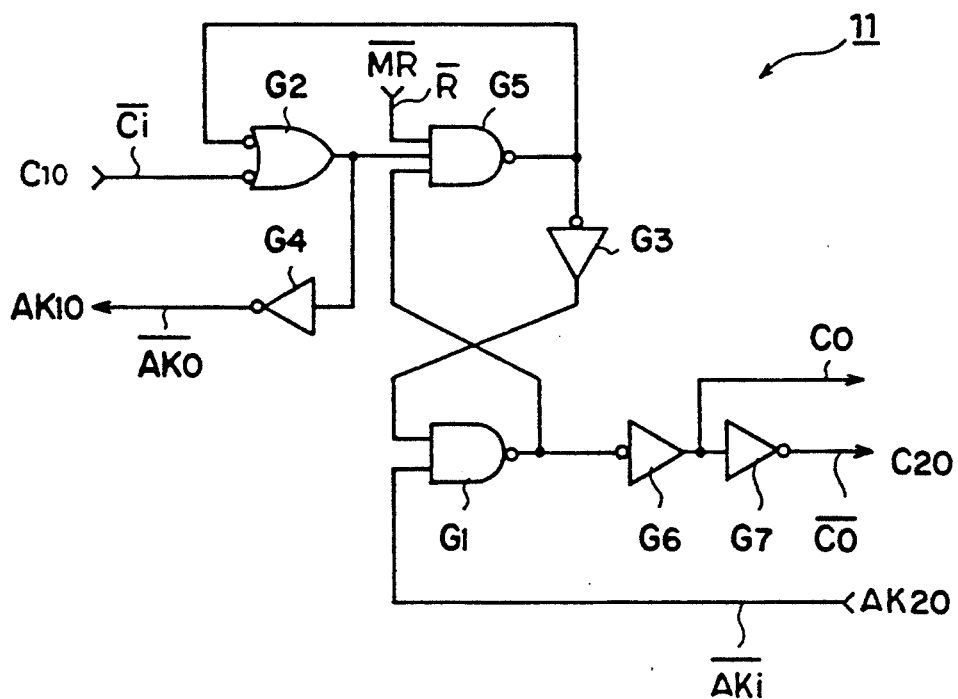
FIG. 4 is a circuit diagram showing a structure of a transfer control portion included in the data transmission apparatus of FIG. 2.
Figure 5:
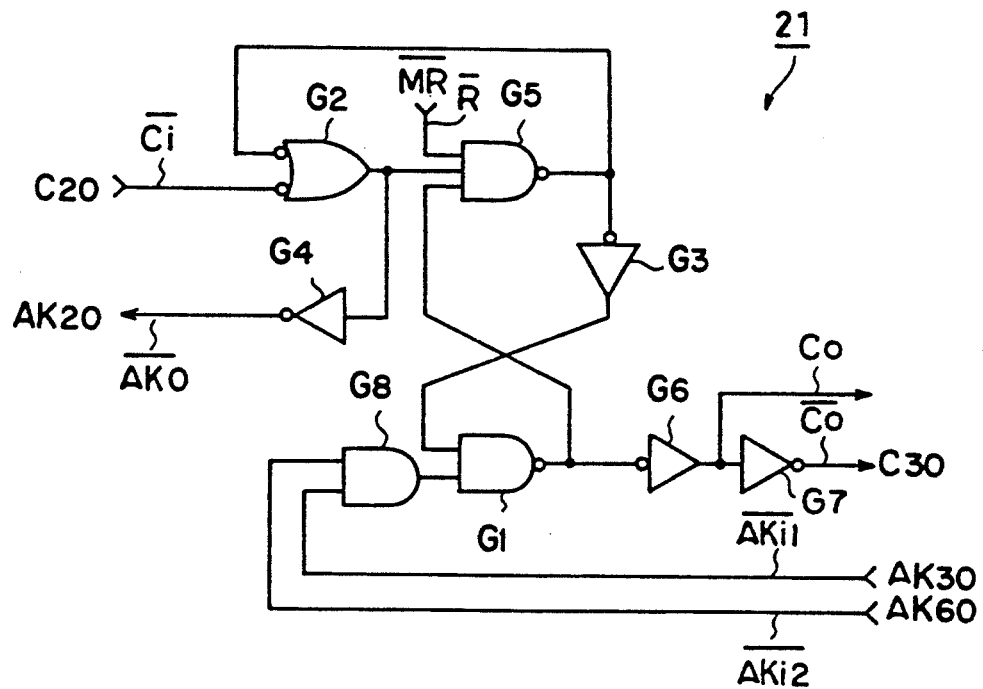
FIG. 5 is a circuit diagram showing a structure of another transfer control portion included in the data transmission apparatus of FIG. 2.
Figure 6:
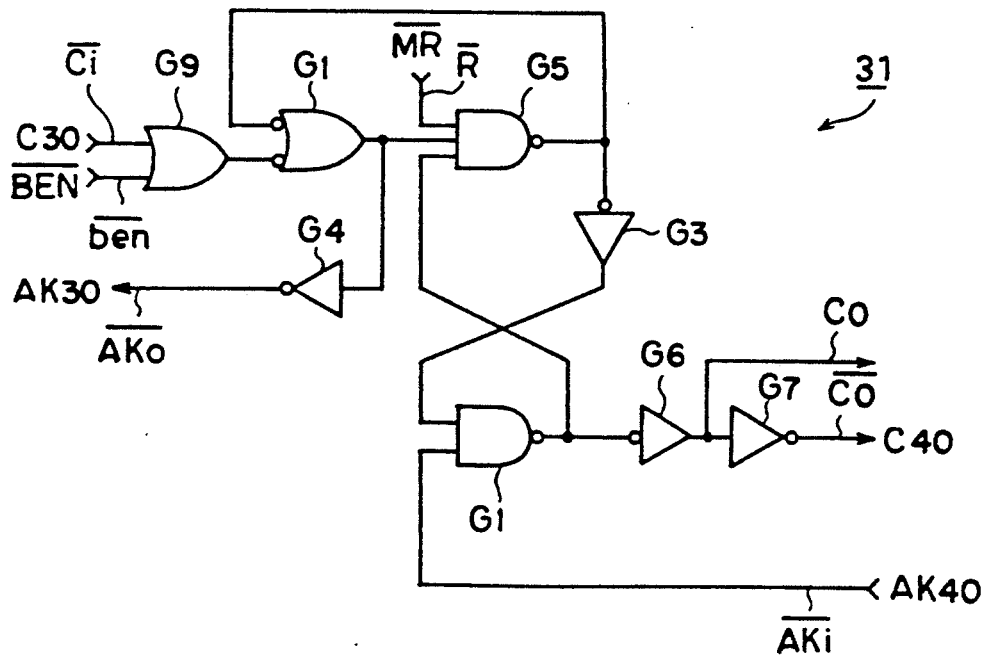
FIG. 6 is a circuit diagram showing a structure of a further transfer control portion included in the data transmission apparatus of FIG. 2.

FIG. 4 shows a detailed circuit structure of the transfer control portion 11, FIG. 5 shows a detailed circuit structure of the transfer control portion 21 and FIG. 6 shows a detailed circuit structure of the transfer control portion 31.

As shown in FIG. 4, the transfer control portion 11 comprises NAND gates G1 and G2, inverters G3 and G4, an NAND gate G5 and inverters G6 and G7.

The transmission signal C10 is supplied to a transmission signal input terminal $\overline{Ci}$ from the preceding stage portion (not shown) and the transmission acknowledging signal AK10 is outputted from a transmission acknowledging signal output terminal $\overline{AKO}$. The transmission signal C20 is outputted from a transmission signal output terminal $\overline{CO}$ and the transmission acknowledging signal AK20 is supplied to a transmission acknowledging signal input terminal $\overline{AKi}$ from the transfer control portion 21 in the succeeding stage (FIG. 2).

Now, the operation of the transfer control portion II of FIG. 4 will be described with reference to the timing charts shown in FIGS. 7 and 8.

Figure 7:
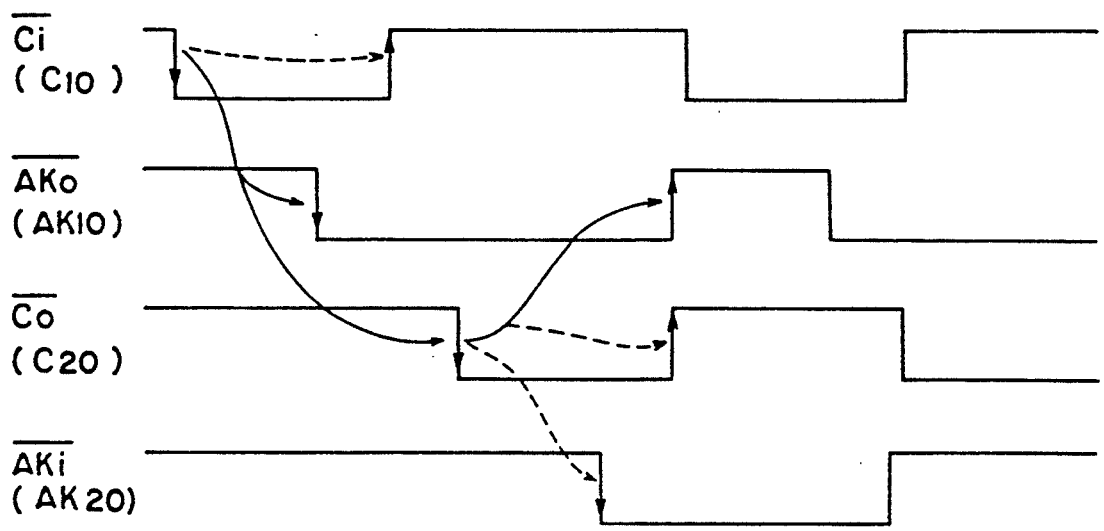
FIG. 7 is a timing chart for explaining an operation of the transfer control portion in case a data transmission path in a succeeding stage is ready.

FIG. 7 is the timing chart for explaining the operation when the data transmission paths in the succeeding stage are empty. When the data transmission paths in the succeeding stage are empty, the transmission acknowledging signal AK20 of the "H" level is supplied from the transfer control portion in the succeeding stage. Therefore, a potential of the transmission acknowledging signal input terminal $\overline{AKi}$ is at the "H" level. When the transmission signal C10 supplied from the preceding stage portion falls to the "L" level, a potential of the transmission signal input terminal $\overline{Ci}$ changes to the "L" level, whereby an output of the NAND gate G2 attains the "H" level. As a result, an output of the inverter G4 attains the "L" level and the transmission acknowledging signal AK10 outputted from the transmission acknowledging signal output terminal $\overline{AKO}$ falls to the "L" level. On the other hand, an output of the NAND gate G5 attains the "L" level and an output of the invert G3 attains the "H" level. On this occasion, since the potential of the transmission acknowledging signal input terminal $\overline{AKi}$ is at the "H" level, an output of the NAND gate G1 falls to the "L" level. As a result, the transmission signal C20 outputted from the transmission signal output terminal $\overline{CO}$ falls to the "L" level.

The transfer control portion 21 in the succeeding stage which receives the transmission signal C20 (FIG. 2) lowers the transmission acknowledging signal AK20 to be supplied to the transfer control portion 11 to the "L" level, in response to the fall of the transmission signal C20. Accordingly, the potential of the transmission acknowledging signal input terminal $\overline{AKi}$ of the transfer control portion 11 falls to the "L" level.

On the other hand, in response to the output of the NAND gate G. falling to the "L" level, the output of the NAND gate G5 and the output of the inverter G3 attain the "H" level and the "L" level respectively. Therefore, the output of the NAND gate G1 rises to the "H" level again. As a result, the transmission signal C20 rises to the "H" level again. Thus, after a lapse of a fixed time period after falling to the "L" level, the transmission signal C20 rises to the "H" level.

The transmission signal C10 supplied from the preceding stage portion rises to the "H" level after a lapse of a fixed time period. Therefore, the output of the NAND gate G2 falls to the "L" level and the output of the invert G4 rises to the "H" level. As a result, the transmission acknowledging signal AK10 rises to the "H" level again.

As described above, when the transmission acknowledging signal AK20 supplied from the transfer control portion in the succeeding stage is in an authorized state ("H" level), the transmission acknowledging signal AK10 supplied to the preceding stage portion enters an inhibited state ("L" level), in response to the fall of the transmission signal C10 supplied from the preceding stage portion, and after a lapse of a fixed time period the transmission signal C20 supplied to the transfer control portion in the succeeding stage falls to the "L" level.

In response to the fall of the transmission signal C20, the data supplied to an input terminal of the data holding circuit 12 is latched and outputted from an output terminal. Namely, the data is transmitted from the data transmission path 10 to the data transmission path 20.

Figure 8:
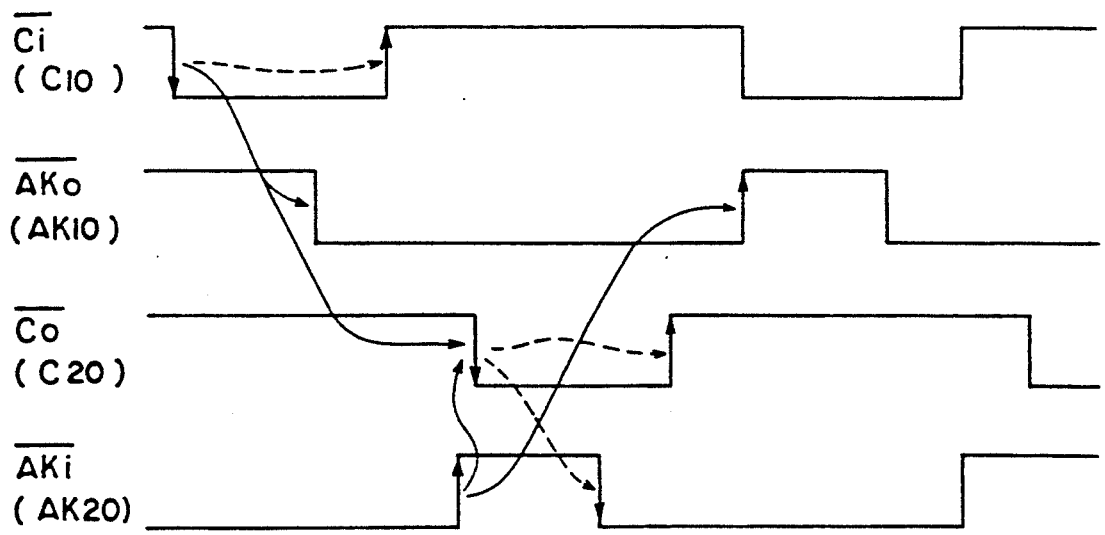
FIG. 8 is a timing chart for explaining an operation of the transfer control portion in case a data transmission path in the succeeding stage is busy.

FIG. 8 is the timing chart for explaining the operation when the data transmission paths in the succeeding stage are busy. In this case, the transmission acknowledging signal AK20 supplied from the transfer control portion in the succeeding stage is at the "L" level. When the transmission signal C10 supplied from the preceding stage portion falls to the "L" level, the output of the NAND gate G2 attains the "H" level and the output of the inverter G4 falls to the "L" level. As a result, the transmission acknowledging signal AK10 outputted from the transmission acknowledging signal output terminal $\overline{AKO}$ falls to the "L" level. When the transmission acknowledging signal AK20 supplied from the transfer control portion in the succeeding stage is at the "L" level (in inhibited state), the output of the NAND gate G1 is at the "H" level. Accordingly, so long as the transmission acknowledging signal AK20 is at the "L" level, the transmission signal C20 supplied to the transfer control portion 21 in the succeeding stage is held at the "H" level. Thus, no data is transmitted from the data transmission path 10 to the data transmission 20 (see FIG. 2).

When the transmission acknowledging signal AK20 supplied from the transfer control portion in the succeeding stage falls to the "H" level, the output of the NAND gate G1 falls to the "L" level. Consequently, the transmission signal C20 supplied to the transfer control portion in the succeeding stage falls to the "L" level. Data supplied to the data holding circuit 12 is latched and outputted in response to the fall of the transmission signal C20 (see FIG. 2).

On the other hand, the transfer control portion in the succeeding stage, in response to the fall of the transmission signal C2 supplied from the transfer control portion 11, lowers the transmission acknowledging signal AK20 to the "L" level which is to be supplied to the transfer control portion 11, after a lapse of a fixed time period. Meanwhile, in response to the rise of the transmission acknowledging signal AK20 supplied from the transfer control portion in the succeeding stage, the transmission acknowledging signal AK10 supplied to the preceding stage portion rises to the "H" level after a lapse of a fixed time period.

As described in the foregoing, when the transmission acknowledging signal AK20 supplied from the transfer control portion in the succeeding stage is in the inhibited state (at the "L" level), the transmission signal C20 to be supplied to the transfer control portion in the succeeding stage does not fall to the "L" level. Namely, when the data transmission path 20 in the succeeding stage is busy, no data is transmitted from the data transmission path 10 to the data transmission path 20.

Structures of the transfer control portions 41, 51 and 61 are the same as that shown in FIG. 4.

FIG. 5 is a circuit diagram showing a structure of the transfer control portion 21 shown in FIG. 2.

The transfer control portion 21 shown in FIG. 5 is further provided with an NAND gate G8. One input terminal of the AND gate G8 is connected to a transmission acknowledging signal input terminal $\overline{AKi1}$ and the other input terminal is connected to a transmission acknowledging signal input terminal $\overline{AKi2}$. The transmission acknowledging signal AK30 is supplied to the transmission acknowledging signal input terminal $\overline{AKi1}$ from the transfer control portion 31 (FIG. 2). In addition, the transmission acknowledging signal AK60 is supplied to the transmission acknowledging signal input terminal $\overline{AKi2}$ from the transfer control portion 61 (FIG. 2). An output terminal of the AND gate G8 is connected to one input terminal of the NAND gate G1. The transmission signal C20 is supplied to the transmission signal input terminal $\overline{Ci}$ from the transfer control portion 11 in the preceding stage (FIG. 2) and the transmission acknowledging signal AK20 is outputted from the transmission acknowledging signal output terminal $\overline{AKo}$. In addition, the transmission signal C30 is outputted from the transmission signal output terminal $\overline{Co}$. The structures of the other portions are the same as those of the transfer control portion 11 shown in FIG. 4.

With respect to the operation of the transfer control portion 21 shown in FIG. 5, the waveforms of the transmission signal AK20 shown in FIGS. 7 and 8 correspond to the output of the AND gate G8. Accordingly, only when both of the transmission acknowledging signal AK30 and the transmission acknowledging signal AK60 are at the "H" level, the transmission signal C30 falls to the "L" level.

FIG. 6 is a circuit diagram showing the structure of the transfer control portion 31 shown in FIG. 2.

The transfer control portion 31 of FIG. 6 is further provided with an OR gate G9. One input terminal of the OR gate G9 is connected to the transmission signal input terminal $\overline{Ci}$ and the other input terminal is connected to a control signal input terminal $\overline{ben}$. The control signal C30 is supplied to the transmission signal input terminal $\overline{Ci}$ from the transfer control portion 21 (FIG. 2). The control signal $\overline{BEN}$ is supplied to the control signal input terminal $\overline{ben}$ from the control portion 93 (FIG. 2). The transmission acknowledging signal AK30 is outputted from the transmission acknowledging signal output terminal $\overline{AKo}$. In addition, the transmission signal C40 is outputted from the transmission signal output terminal $\overline{Co}$ and the transmission acknowledging signal AK40 is supplied to the transmission acknowledging $\overline{AKi}$ from the transfer control portion 41 in the succeeding stage (FIG. 2). The structures of other portions are the same as those of the transfer control portion 11 of FIG. 4.

With respect to the operation of the transfer control portion 31 of FIG. 6, the waveforms of the transmission signal C10 shown in FIGS. 7 and 8 correspond to the waveform of the output of the OR gate G9. Accordingly, when a control signal $\overline{BEN}$ is at the "L" level, the operation shown in FIGS. 7 and 8 is performed.

As the foregoing, in the above described embodiments, the packet data supplied through the input-side transmission paths on the is autonomously and selectively transmitted to either or both of the two output-side transmission paths, based on the identifier included in the packet data.

In the above described embodiment, description is made of the data transmission apparatus in which packet data comprising two words is transmitted to either or both of the two output-side transmission paths. However, data to be transmitted is not limited to data comprising two words but may be data comprising one word or more than three words. In case of the data comprising one word, the divider 94 shown in FIG. 2 is not necessary. In addition, in case of the data comprising more than three words, a division ratio of the divider 94 may be set in accordance with the number of words of the data. Accordingly, packet data comprising an arbitrary number of words can be easily branched and shunted.

In addition, the number of output-side transmission paths is not limited to two but may be more than three.

Furthermore, while in the above described embodiment, packet data is branched or shunted, based on the result of comparison between the identifier included in the packet data and the predetermined branch destination specifying bit BR in the comparison and determination logic portion 92, it may be branched or shunted depending on whether the identifier included in the packet data is detected or not.

Figure 9:
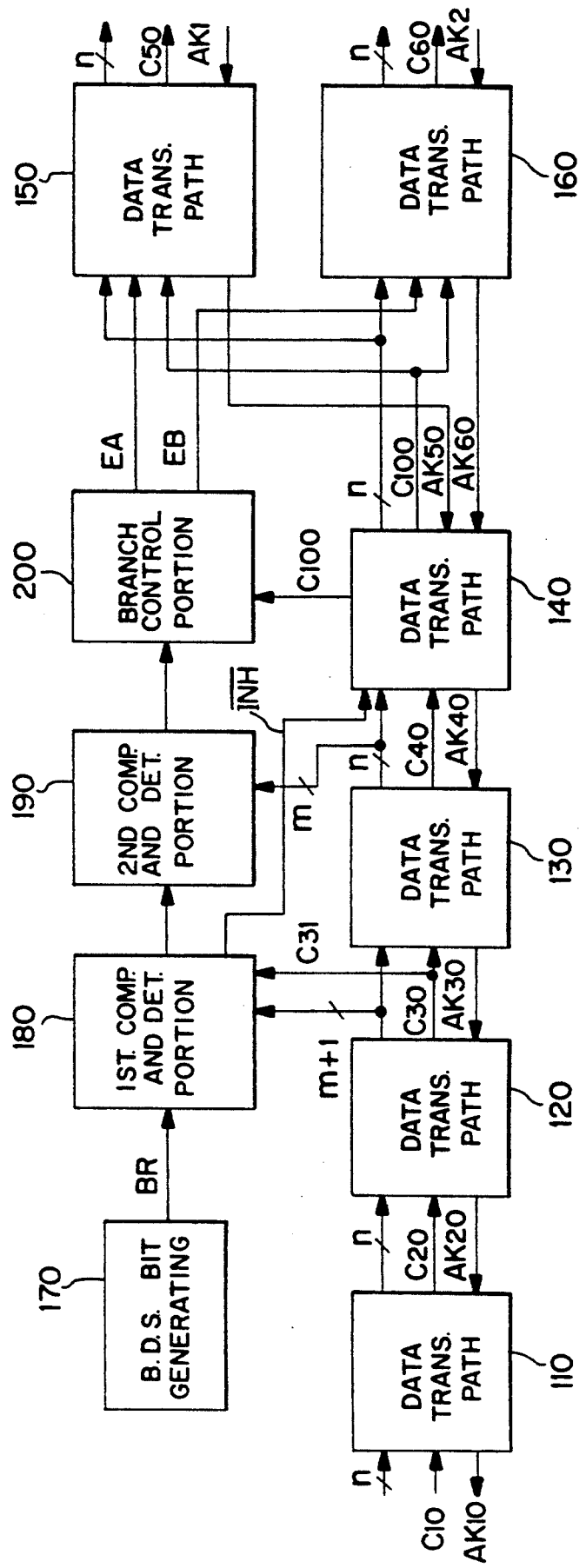
FIG. 9 is a block diagram showing a structure of a data transmission apparatus according to a second embodiment of the present invention.

FIG. 9 is a block diagram showing a structure of a data transmission apparatus according to a second embodiment of the present invention.

In FIG. 9, data transmission paths 110, 120, 130 and 140 constitute an input-side transmission path. A data transmission path 150 is included in a first output-side transmission path. A data transmission path 160 is included in a second output-side transmission path. In the data transmission apparatus according to the present invention, packet data comprising a plurality of words is transmitted.

Figure 10A:
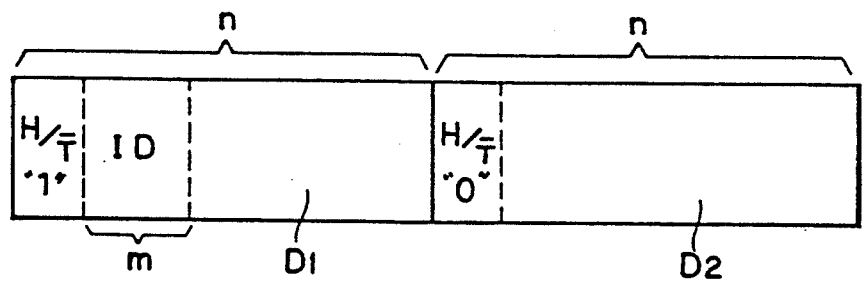
FIG. 10A is a diagram showing a structure of packet data transmitted in the data transmission apparatus of FIG. 9.

In the embodiment of FIG. 9, packet data comprising two words is transmitted. The packet data comprises, for example, a first word D1 of n bits and a second word D2 of n bits, as shown in FIG. 10A and or FIG. 10B. Either the first word D1 or the second D2 includes an identifier ID of m bits. The identifier ID indicates a branch destination of the packet data. In addition, each of the first and the second words D1 and D2 includes an identifier H/T indicating whether the word is the first word D1 or the second word D2. The identifier H/T included in the first word D1 is set to "1" and the identifier H/T included in the second word D2 is set to "0".

In FIG. 9, the first word D1 of the packet data supplied to the data transmission path 110 is transmitted to the data transmission path 140 through the data transmission paths 120 and 130. Subsequently to the first word D1, the second word D2 of the packet data is transmitted to the data transmission path 130 through the data transmission paths 110 and 120. The first word D1 of the packet data which has arrived at the data transmission path 140 is transmitted to either the data transmission path 150 or 160. Subsequently to the first word D1, the second word D2 of the packet data which has arrived at the data data transmission path 130 is transmitted to either the data transmission path 150 or 160 through the data transmission path 140.

The data transmission apparatus according to the present embodiment further comprises a branch destination specifying bit generating portion 170, a first comparison and determination portion 180, a second comparison and determination portion 190 and a branch control portion 200. The branch destination specifying bit generating portion 170 is preset so as to generate a predetermined branch destination specifying bit BR. The branch destination specifying bit BR is supplied to the first comparison and determination portion 180 and the second comparison and determination portion 190.

Figure 10B:
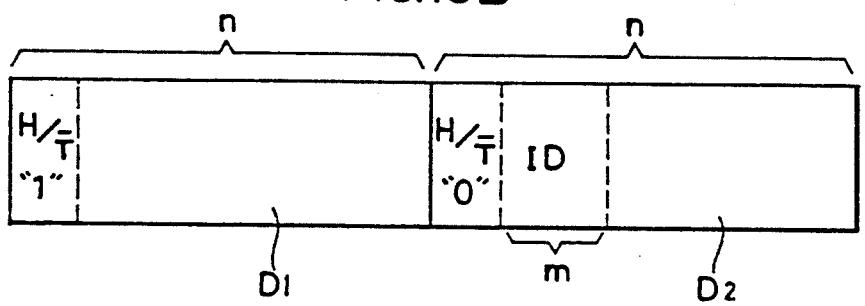
FIG. 10B is a diagram showing another structure of packet data transmitted in the data transmission apparatus of FIG. 9.

As shown in FIG. 10, in case the first word D1 of the packet data includes an identifier ID, the identifier included in the first word D1 transmitted from the data transmission path 130 to the data transmission path 140 is compared with the branch destination specifying bit BR in the second comparison and determination portion 190. As shown in FIG. 10B, in case the second word D2 of the packet data includes an identifier ID, the identifier ID included in the second word D2 transmitted from the data transmission path 120 to the data transmission path 130 is compared with the branch destination specifying bit BR in the first comparison and determination portion 180. The result of the determination by the first comparison and determination portion 180 and the second comparison and determination portion 190 is supplied to the branch control portion 200. The branch control portion 200 causes either a first activation signal EA or a second activation signal EB to attain the "H" level (inactivated state), based on the comparison result. Either the data transmission path 150 or 160 is activated by the first activation signal EA or the second activation signal EB. As a result, the first word D1 of the packet data arriving at the data transmission path 140 is transmitted to the activated data transmission path and subsequently to the first word D1, the second word D2 is transmitted to the activated data transmission path through the data transmission path 140.

Figure 11:
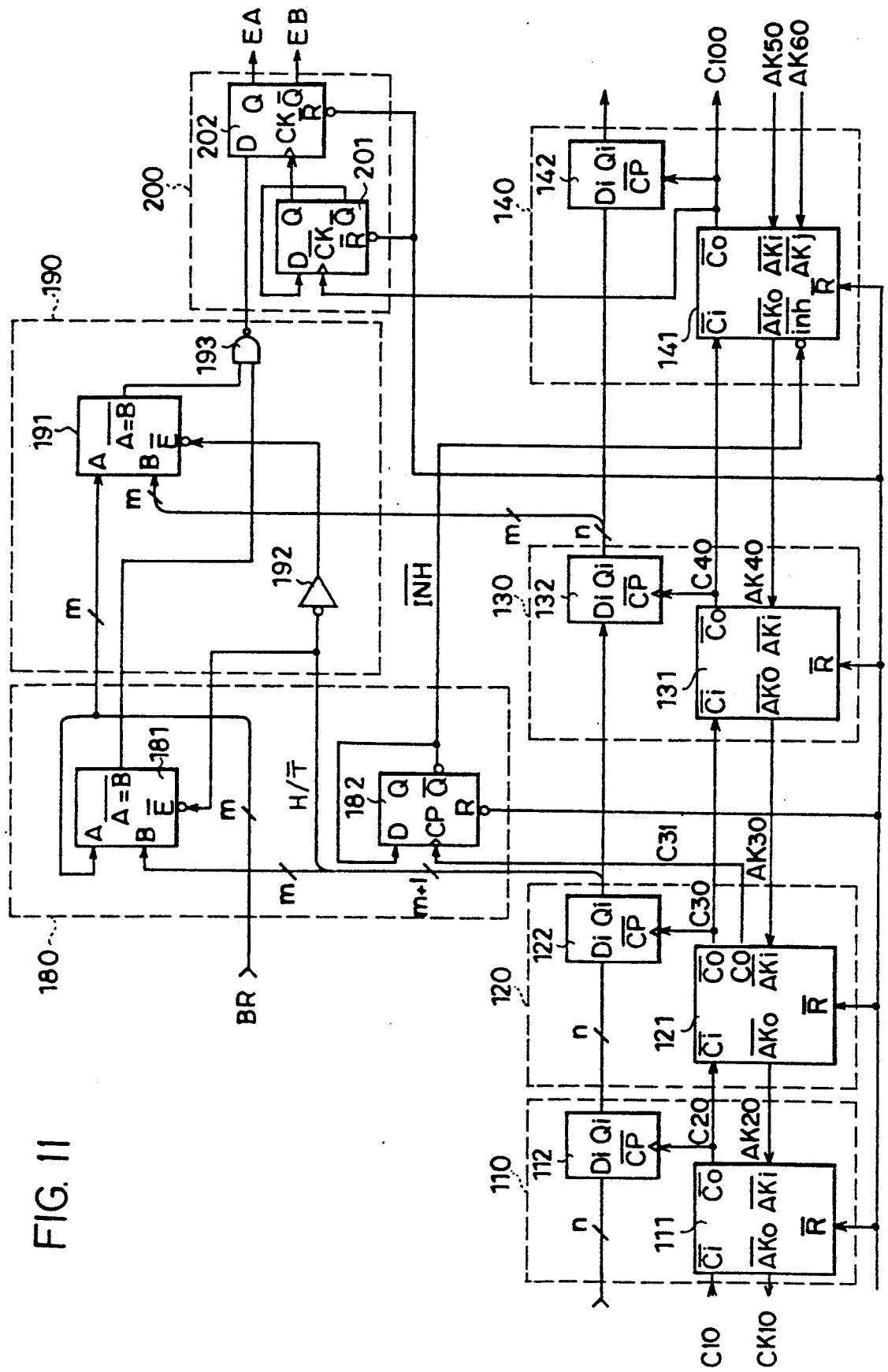
FIG. 11 is a circuit diagram showing a detailed structure of main parts of the data transmission apparatus of FIG. 9.

FIG. 11 is a circuit diagram showing a detail structure of the main portions of the data transmission apparatus of FIG. 9.

In FIG. 11, the data transmission path 110 comprises a transfer control portion 111 and a data holding circuit 112. Similarly, the data transmission path 120 comprises a transfer control portion 121 and a data holding circuit 122, the data transmission path 130 comprises a transfer control portion 131 and a data holding circuit 132, and the data transmission path 140 comprises a transfer control portion 141 and a data holding circuit 142. The first comparison and determination portion 180 comprises a comparator 181 and a D type flip-flop 182. The second comparison and determination portion 190 comprises a comparator 191, an inverter 192 and an NAND gate 193. The branch control portion 200 comprises D type flip-flops 201 and 202.

The transmission signal C10 is supplied to the transfer control portion 111 from the preceding stage (not shown). In response to a fall of the transmission signal C10, the first word D1 of the packet data is supplied to the data holding circuit 112 from the preceding stage portion. The transfer control portion 111 supplies the transmission acknowledging signal AK10 of the "L" level to the preceding stage portion. The transmission acknowledging signal AK10 of the "L" level indicates that transmission is being inhibited. When the transmission acknowledging AK20 of the "H" level is supplied from the transfer control portion 121, the transfer control portion 111 supplies the transmission signal C20 of the "L" level to the data holding circuit 112 and the transfer control portion 121. The transmission acknowledging signal AK20 of the "H" level indicates that transmission is authorized. The data holding circuit 112, in response to the fall of the transmission signal C20, latches the first word D1 of the packet data supplied from the preceding stage portion and outputs the same.

Then, the transfer control portion 121, when the transmission acknowledging signal AK30 of the "H" level is supplied from the transfer control portion 131, supplies the transmission signal C30 of the "L" level to the data holding circuit 122 and the transfer control portion 131, in response to the fall of the transmission signal C20. The data holding circuit 122, in response to the fall of the transmission signal C30, latches the first word D1 supplied from the data holding circuit 112 and outputs the same.

Figure 12:
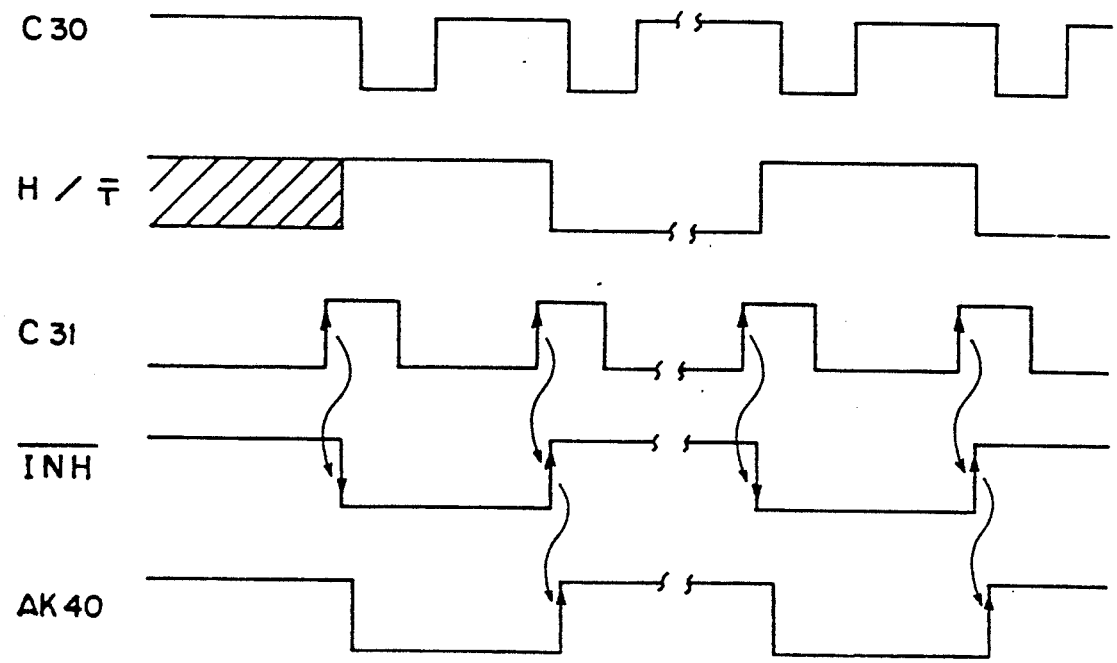
FIG. 12 is a timing chart for explaining an operation of the data transmission apparatus shown in FIGS. 9 and 11.

On this occasion, a transmission signal C31, an inversion of the transmission signal C30 is supplied to a clock terminal CP of the D type flip-flop 182. An inhibiting signal $\overline{INH}$ outputted from an inversion output terminal $\overline{Q}$ of the D type flip-flop 182 falls to the "L" level, in response to a rise of the transmission signal C31. The D type flip-flop 182 operates as a divider for frequency-dividing the transmission signal C31 by two. Accordingly, as shown in FIG. 12, the inhibiting signal $\overline{INH}$ inverts in response to the rise of the transmission signal C31. Inhibiting signal $\overline{INH}$ is supplied to an input terminal inh of the transfer control portion 141. The transfer control portion 141 is not activated when the inhibiting signal $\overline{INH}$ is at the "L" level.

On the other hand, the identifier H/T included in the first word D1 outputted from the data holding circuit 122 is supplied to an enable terminal $\overline{E}$ of the comparator 181 and to an enable terminal $\overline{E}$ of the comparator 191 through the inverter 192. Since the identifier H/T included in the first word D1 is "1", the comparator 181 is not activated and the comparator 191 is activated.

First, as shown in FIG. 10A, it is assumed that the first word D1 of the packet data includes an identifier ID. In this case, the identifier ID included in the first D1 outputted from the data holding circuit 122 is supplied to an input terminal B of the comparator 181. However, since the comparator 181 is not activated, no comparison is performed between the branch destination specifying bit BR and the identifier ID by the comparator 181. In this case, the output of the comparator 181 is at the "H" level.

Then, in the same manner, the first word D1 outputted from the data holding circuit 122 is latched in the data holding circuit 132 and outputted therefrom. The identifier ID included in the first word D1 outputted from the data holding circuit 132 is supplied to an input terminal B of the comparator 191.

The comparator 191 compares the identifier ID included in the first word D1 outputted from the data holding circuit 132 with the branch destination specifying bit BR. If the identifier ID and the branch destination specifying bit BR coincide with each other, an output of the comparator 191 attains the "L" level. As a result, an output of the NAND gate 193 attains the "H" level. On the contrary, if the identifier ID and the branch destination specifying bit BR do not coincide with each other, the output of the comparator 191 attains the "H" level. Since the output of the comparator 181 is at the "H" level, the output of the NAND gate 193 attains the "L" level.

Subsequently to the first word D1 of the packet data, the second word D2 is supplied to the data holding circuit 122 through the data holding circuit 112. The data holding circuit 122 latches the second word D2 and outputs the same, in response to the fall of the transmission signal C30. On this occasion, the transmission signal C31 rises to the "H" level. The D type flip-flop 182 causes the inhibiting signal $\overline{INH}$ to attain the "H" level (in authorized state), in response to the rise of the transmission signal C31.

In response to a rise of the inhibiting signal $\overline{INH}$, the transfer control portion 141, when the transmission acknowledging signal AK50 of the "H" level is supplied from the data transmission path 150 (FIG. 9) and the transmission acknowledging signal AK60 of the "H" level is supplied from the data transmission path 160 (FIG. 9, supplies a transmission signal C100 of the "L" level to the data transmission paths 150 and 160. The data holding circuit 142 latches the first word D1 supplied from the data holding circuit 132 and outputs the same, in response to a fall of the transmission signal C100.

In addition, the D type flip-flop 201 outputs a signal of the "H" level from an output terminal Q, in response to the fall of the transmission signal C100. The D type flip-flop 202, in response to a rise of the signal supplied from the D type flip-flop 201, outputs the output of the NAND gate 193 from an output terminal Q and outputs an inversion of the output from an inversion output terminal $\overline{Q}$. Consequently, either one of the first activation signal EA and the second activation signal EB attains the "H" level and the other attains the "L" level. As a result, either the data transmission path 150 or 160 (FIG. 9) is activated.

More specifically, when the identifier ID and the branch destination specifying bit BR coincide with each other, the second activation signal EA attains the "H" level to activate the data transmission path 150. On the contrary, when the identifier ID and the branch destination specifying bit BR do not coincide with each other, the second activation signal EB attains the "H" level to activate the data transmission path 160. As a result, the first word D1 outputted from the data holding circuit 142 is transmitted to only one of the data transmission paths 150 and 160.

In the same manner, subsequently to the first word D1, the second word D2 of the packet data is transmitted to either the data transmission path 150 or 160 through the data holding circuits 132 and 142.

Now, as shown in FIG. 10B, it is assumed that the second word D2 of the packet data includes an identifier ID. Also in this case, m bits of the first word D1 outputted from the data holding circuit 122 are supplied to the comparator 181. However, since the comparator 181 is not activated, the output of the comparator 181 is held at the "H" level. On this occasion, the inhibiting signal $\overline{INH}$ outputted from the D type flip-flop 182 is at the "L" level (in the inhibited state). Accordingly, the transfer control portion 141 is not activated. Thereafter, the first word D1 outputted from the data holding circuit 122 is latched in the data holding circuit 132 and outputted therefrom.

Subsequently to the first word D1 of the packet data, the second word D2 is supplied to the data holding circuit 122 through the data holding circuit 112. The data holding circuit 122 latches the data supplied from the data holding circuit 112 and outputs the same, in response to the fall of the transmission signal C30. The identifier H/T included in the second word D2 outputted from the data holding circuit 122 is supplied to the enable terminal $\overline{E}$ of the comparator 181 and to the enable terminal $\overline{E}$ of the comparator 191 through the inverter 192. Since the identifier H/T included in the second word D2 is "0", the comparator 181 is activated and the comparator 191 is not activated.

The identifier ID included in the second word D2 outputted from the data holding circuit 122 is supplied to the input terminal B of the comparator 181. The comparator 181 compares the identifier ID with the branch destination specifying bit BR. When the identifier ID and the branch destination specifying bit BR coincide with each other, the output of the comparator 181 attains the "L" level. On the contrary, when the identifier ID and the branch destination specifying bit BR do not coincide with each other, the output of the comparator 181 attains the "H" level. Since on this occasion, the comparator 191 is not activated, the output of the comparator 191 is held at the "H" level. Accordingly, when the identifier ID and the branch destination specifying bit BR coincide with each other, the output of the NAND gate 193 attains the "L" level, and when the identifier ID and the branch destination specifying bit BR do not coincide with each other, the output of the NAND gate 193 attains the "H" level.

In addition, in response to the rise of the transmission signal C31, the inhibiting signal $\overline{INH}$ attains the "H" level (in the authorized state). As a result, the transfer control portion 141 is activated. The transfer control portion 141, when the transmission acknowledging signal AK50 of the "H" level is supplied from the data transmission path 150 (FIG. 9) and the transmission acknowledging signal AK60 of the "H" level is supplied from the data transmission path 160 (FIG. 9), supplies the transmission signal C100 of the "L" level to the data holding circuit 142 and the data transmission paths 150 and 160, in response to a rise of the inhibiting signal $\overline{INH}$. The data holding circuit 142, in response to the fall of the transmission signal C100, latches the first word D1 supplied from the data holding circuit 132 and outputs the same.

The D type flip-flop 201 outputs a signal of the "H" level from the output terminal Q, in response to the fall of the transmission signal C100. The D type flip-flop 202, in response to a rise of the signal supplied from the D type flip-flop 201, outputs the output of the NAND gate 93 from the output terminal Q and outputs an inversion of the output from the inversion output terminal $\overline{Q}$. Consequently, either one of the first activation signal EA and the second activation signal EB attains the "H" level and the other attains the "L" level. As a result, either the data transmission path 150 or 160 (FIG. 9) is activated. Accordingly, the first word D1 is transmitted from the data holding circuit 142 to either the data transmission path 150 or 160.

In the same manner, subsequently to the first word D1 of the packet data, the second word D2 is transmitted to either the data transmission path 150 or 160 through the data holding circuit 130 and the data holding circuit 140.

As described above, in case the first word D1 includes an identifier ID, the identifier ID and the branch destination specifying bit BR are compared by the comparator 191. In case the second word D2 includes an identifier ID, the identifier ID and the branch destination specifying bit BR are compared by the comparator 181. In addition, the first activation signal EA and the second activation signal EB outputted from the D type flip-flop 202 do not change until the first word D1 and the second D2 of the packet data are transmitted to one of the data transmission paths 150 and 160. Therefore, data transmission is performed on packet data basis from the data transmission path 140 to one of the data transmission paths 150 and 160.

Meanwhile, the structures of the transfer control portions 111, 121 and 131 are the same as those shown in FIG. 4.

Figure 13:
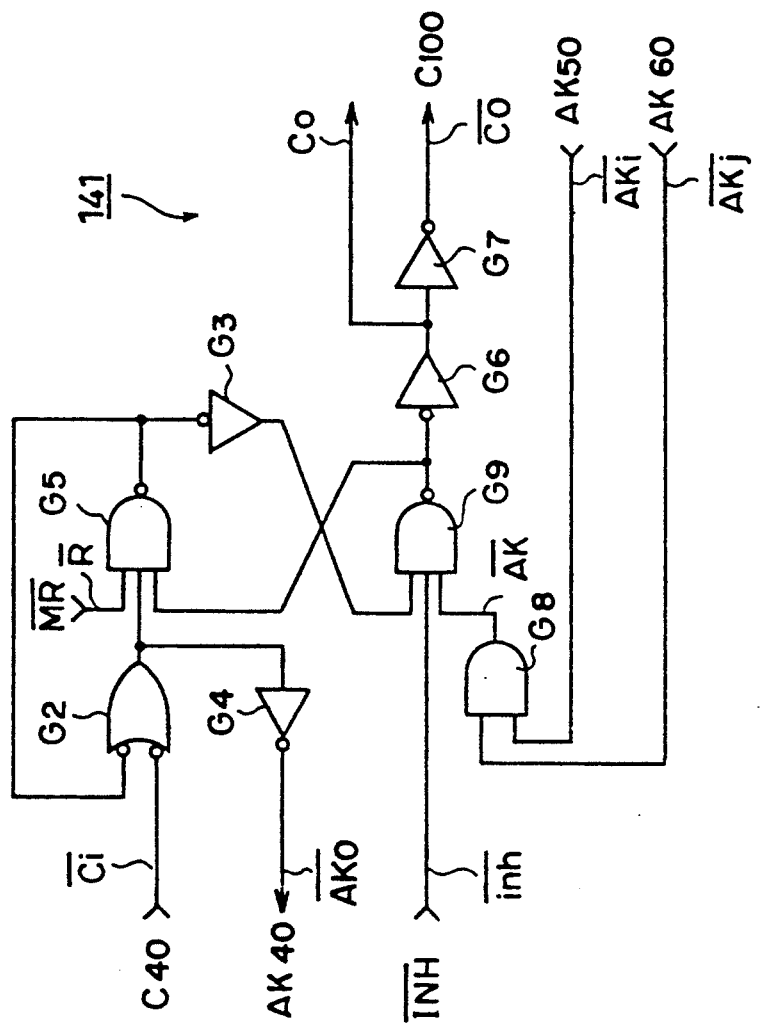
FIG. 13 is a circuit diagram showing a structure of still another transfer control portion included in the data transmission apparatus of FIG. 11.

FIG. 13 is a circuit diagram showing the structure of the transfer control portion 141 shown in FIG. 11.

The transfer control portion 141 of FIG. 13 is further provided with an AND gate G8. In addition, instead of the NAND gate G1 of FIG. 4, three-input NAND gate G9 is provided. One input terminal of the AND gate G8 is connected to a transmission acknowledging signal input terminal $\overline{AKi}$ and the other input is connected to a transmission acknowledging signal input terminal $\overline{AKj}$. The transmission acknowledging signal AK50 is supplied to the transmission acknowledging signal input terminal $\overline{AKi}$ from the data transmission path 150 (FIG. 9). In addition, the transmission acknowledging signal AK60 is supplied to the transmission signal acknowledging signal input terminal $\overline{AKj}$ from the data transmission path 160 (FIG. 9). An output terminal of the AND gate G8 is connected to one input terminal of the NAND gate G9. Other one input terminal of the NAND gate G9 is connected to an input terminal inh for receiving the inhibiting signal $\overline{INH}$.

The transmission signal C40 is supplied to the transmission signal input terminal $\overline{Ci}$ from the transfer control portion 131 in the preceding stage (FIG. 11) and the transmission acknowledging signal AK40 is outputted from the transmission acknowledging signal output terminal $\overline{AKO}$. In addition, the transmission signal C100 is outputted from the transmission signal output terminal $\overline{CO}$. The structures of the other portions are the same as those of the transfer control portion 11 of FIG. 4.

Figure 14:
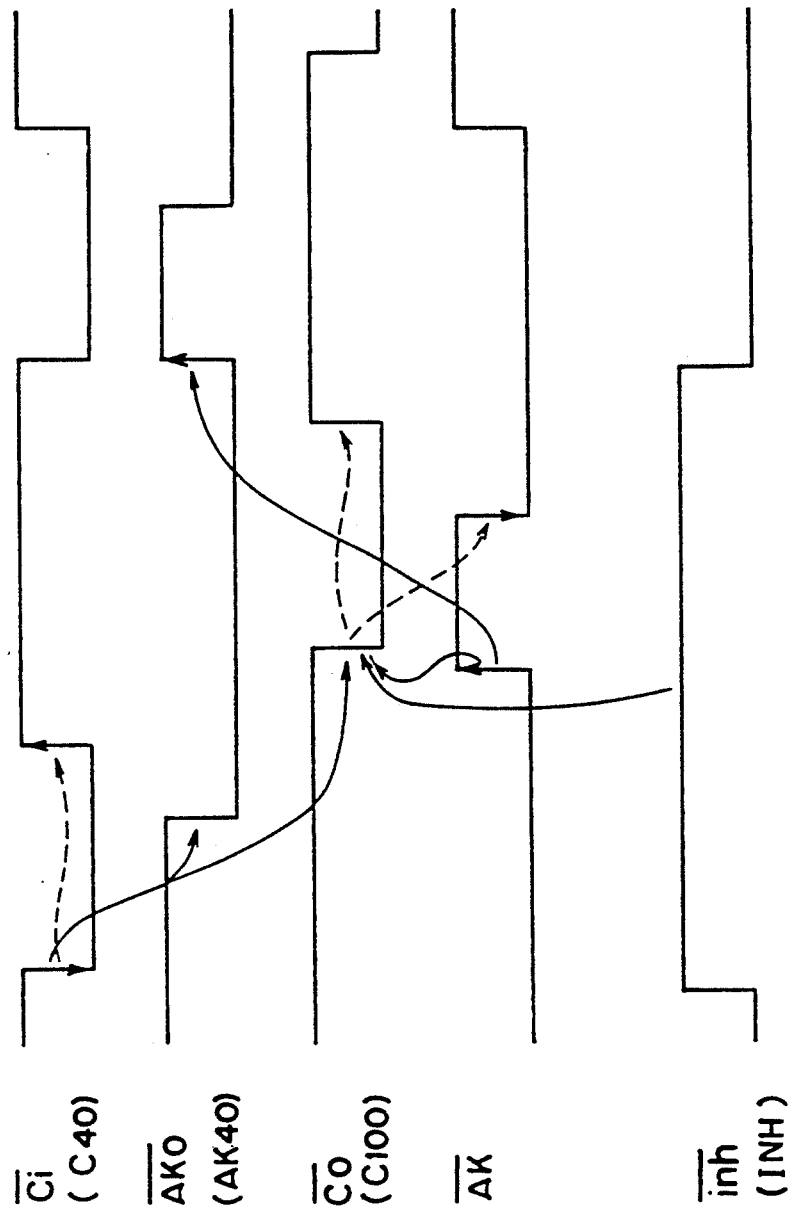
FIG. 14 is a timing chart for explaining an operation of the transfer control portion of FIG. 13.

FIG. 14 is a timing chart for explaining the operation of the transfer control portion 141 of FIG. 13.

With respect to the operation of the transfer control portion 141 when the inhibiting signal $\overline{INH}$ is at the "H" level, the waveforms of the transmission acknowledging signal AK20 shown in FIGS. 7 and 8 correspond to an output AK of the AND gate G8. Accordingly, only when both of the transmission acknowledging signal AK50 and the transmission acknowledging signal AK60 are at the "H" level, the transmission signal C100 falls to the "L" level. When the inhibiting signal $\overline{INH}$ is at the "L" level, the transmission signal C100 does not fall to the "L" level. Accordingly, no packet data is transmitted from the data holding circuit 142 (FIG. 11) to the data transmission path 150 or 160 (FIG. 9) until the inhibiting signal $\overline{INH}$ rises to the "H" level.

As the foregoing, in the above described embodiment, the packet data supplied through the input-side transmission path is transmitted autonomously and selectively to one of the two output-side transmission paths, based on an identifier included in an arbitrary word of the packet data.

In the above described embodiment, the description is made of the data transmission apparatus in which packet data comprising two words is transmitted to either of the two output-side transmission paths. However, data to be transmitted is not limited to data comprising two words, but may be data comprising more than three words. In case the data comprises more than three words, a plurality of comparison and determination portions may be provided in accordance with the number of words of the data. In this case, in place of the D type flip-flop 182 for frequency-dividing the transmission signal C31 and the D type flip-flop 201 for frequency-dividing the transmission signal C100, it is necessary to provide a divider for performing division in accordance with the number of words included in the data. Thus, packet data comprising an arbitrary number of words can be easily transmitted.

In addition, the number of output-side transmission paths is not limited to two but may be more than three.

Furthermore, while in the above described embodiment, the packet data is branched, based on a result of the comparison between the identifier ID included in the packet data and the predetermined branch destination specifying bit BR in the first comparison and determination portion 180 and the second comparison and determination portion 190, it may be branched depending on whether the identifier included in the data packet is detected or not.

Figure 15:
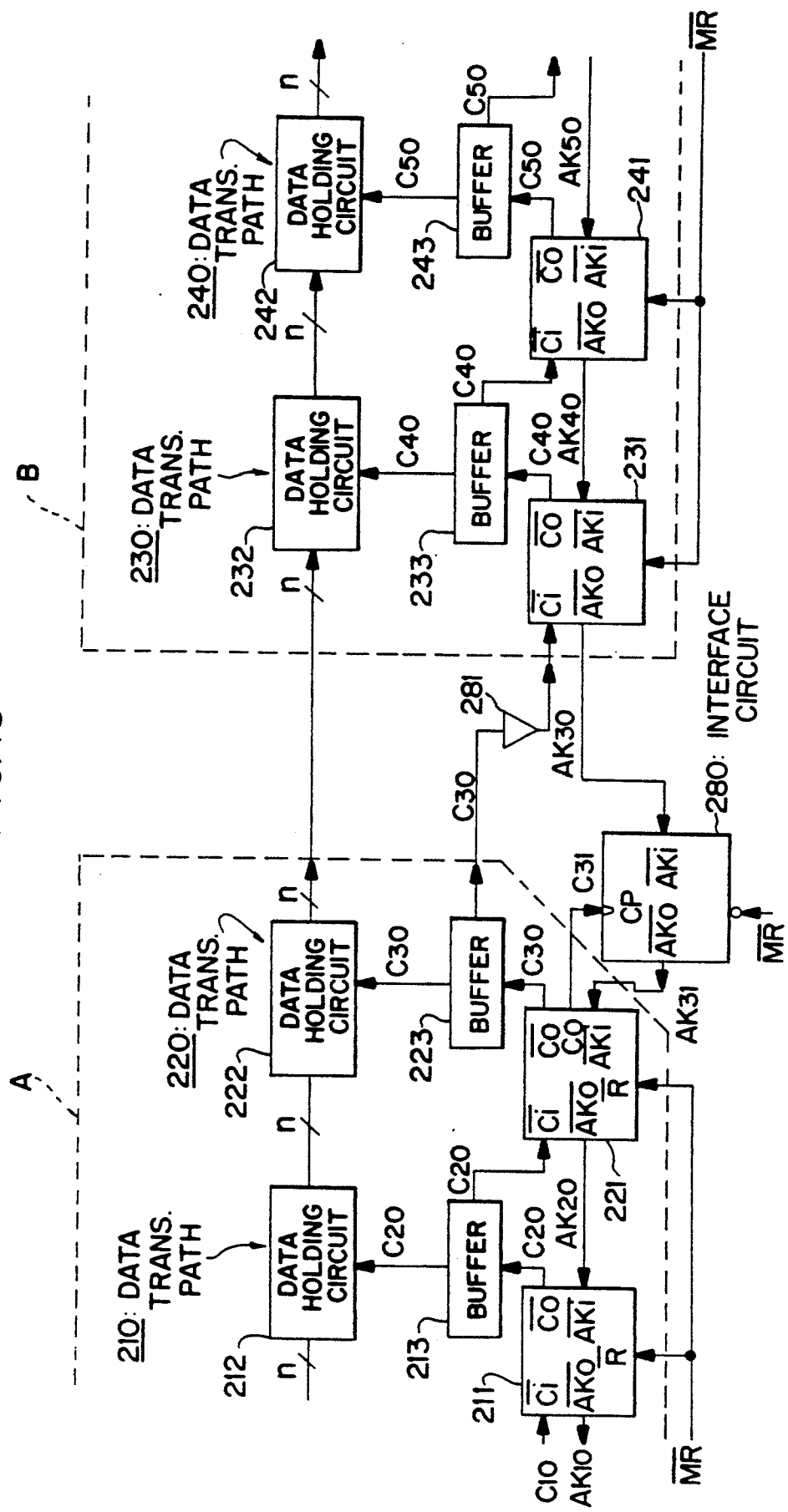
FIG. 15 is a block diagram showing a structure of an interface apparatus according to a third embodiment of the present invention.

FIG. 15 is a block diagram showing a structure of an interface apparatus according to a third embodiment oft he present invention. The interface apparatus of FIG. 15 is for controlling data transmission between a first information processor A and a second information processor B.

In FIG. 15, the first information processor A includes data transmission paths 210 and 220. The data transmission path 210 comprises a transfer control portion 211, a data holding circuit 212 and a buffer 213. The data transmission path 220 comprises a transfer control portion 221, a data holding circuit 222 and a buffer 223. The second information processor B includes data transmission paths 230 and 240. The data transmission path 230 comprises a transfer control portion 231, a data holding circuit 232 and a buffer 233. The data transmission path 240 comprises a transfer control portion 241, a data holding circuit 242 and a buffer 243.

An interface circuit 280 is provided between the transfer control portion 221 in the data transmission path 220 and the transfer control portion 231 in the data transmission path 230. In addition, a buffer 281 is provided between the buffer 223 in the data transmission path 220 and the transfer control portion 231 in the data transmission path 230.

Data supplied to the data holding circuit 212 from the preceding stage portion (not shown) is transmitted to the data holding circuit 222. Data transmission from the data holding circuit 212 to data holding circuit 222 is controlled by the transfer control portion 211. The data received by the data holding circuit 222 is transmitted to the data holding circuit 232. Data transmission from the data holding circuit 222 to the data holding circuit 232 is controlled by the transfer control portion 221 and the interface circuit 280. The data received by the data holding circuit 232 is transmitted to the data holding circuit 242. The data transmission from the data holding circuit 232 to the data holding circuit 242 is controlled by the transfer control portion 231. The data received by the data holding circuit 242 is transmitted to the succeeding stage portion (not shown). The data transmission from the data holding circuit 242 to the succeeding stage portion is controlled by the transfer control portion 241. The data to be transmitted in this embodiment is of n bits.

The transmission signal C10 is supplied to the transfer control portion 211 from the preceding stage portion. In response to a fall of the transmission signal C10, data is supplied to the data holding circuit 212 from the preceding stage. The transfer control portion 211 supplies the transmission acknowledging signal AK10 of the "L" level to the preceding stage portion. The transmission acknowledging signal AK10 of the "L" level indicates that transmission is being inhibited. When the transmission acknowledging signal AK20 of the "H" level is supplied from the transfer control portion 221, the transfer control portion 11 supplies the transmission signal C20 of the "L" level to the data holding circuit 212 and the transfer control portion 221 through the buffer 213. The transmission acknowledging signal AK20 of the "H" level indicates that transmission is being authorized. In response to a fall of the transmission signal C20, the data holding circuit 212 latches the data supplied from the preceding stage portion and outputs the same.

The transfer control portion 221, when the transmission acknowledging signal AK31 of the "H" level is supplied from the interface circuit 280, supplies the transmission signal C30 of the "L level to the data holding circuit 222 through the buffer 223 and also to the transfer control portion 231 through the buffers 223 and 281, in response to a fall of the transmission signal C20. In response to the fall of the transmission signal C30, the data holding circuit 222 latches the data supplied from the data holding circuit 212 and outputs the same. The transfer control portion 231, when the transmission acknowledging signal AK40 of the "H" level is supplied from the transfer control portion 241, supplies the transmission signal C40 of the "L" level to the data holding circuit 232 and the transfer control portion 241 through the buffer 233, in response to the fall of the transmission signal C30. In response to a fall of the transmission signal C40, the data holding circuit 232 latches the data supplied from the data holding circuit 222 and outputs the same. In the same manner, the data supplied to the data holding circuit 242 is transmitted to the succeeding stage portion.

A transmission signal C31 having an opposite polarity to that of a transmission signal C30 is supplied to a clock terminal CP of the interface circuit 280 from the transfer control portion 221. In addition, a transmission acknowledging signal AK30 is supplied to a transmission acknowledging signal input terminal $\overline{AKi}$ of the interface circuit 280 from the transfer control portion 231. When the transmission signal C31 supplied from the transfer control portion 221 rises to the "H" level, the interface circuit 280 lowers a transmission acknowledging signal AK31 to be supplied to the transfer control portion 221 to the "L" level (inhibited state). In response to the rise of the transmission signal C31, the transmission signal C30 to be supplied from the transfer control portion 221 to the transfer control portion 231 falls to the "L level. In response to the fall of the transmission signal C30, data is transmitted from the data holding circuit 220 to the data holding circuit 232.

The change of the transmission signal C30 to the "L" level is transmitted to the transfer control portion 231 through the buffer 281. Since the buffer 281 is provided between the buffer 223 and the transfer control portion 231, the transmission signal C30 from the buffer 223 is late in arriving at the transfer control portion 231 than the data from the data holding circuit 222 arrives at the data holding circuit 232. In response to the fall of the transmission signal C30, the transfer control portion 231 lowers the transmission acknowledging signal AK30 to be supplied to the interface circuit 280 to the "L" level and raises the transmission acknowledging signal AK30 to the "H" level (authorized state) after a lapse of a fixed time period. In response to the rise of the transmission acknowledging signal AK30, the interface circuit 280 raises the transmission acknowledging signal AK31 to be supplied to the transfer control portion 221 to the "H" level (authorized state). As a result, additional data can be transmitted from the data holding circuit 222 to the data holding circuit 232.

Accordingly, as described above, in the embodiment of FIG. 15, transmission of additional data from the first information processor A to the second information processor B is inhibited until the data transmission from the first information processor A to the second information processor B is completed.

The structures of the transfer control portions 211, 221, 231 and 241 are the same as those shown in FIG. 4.

Figure 16:
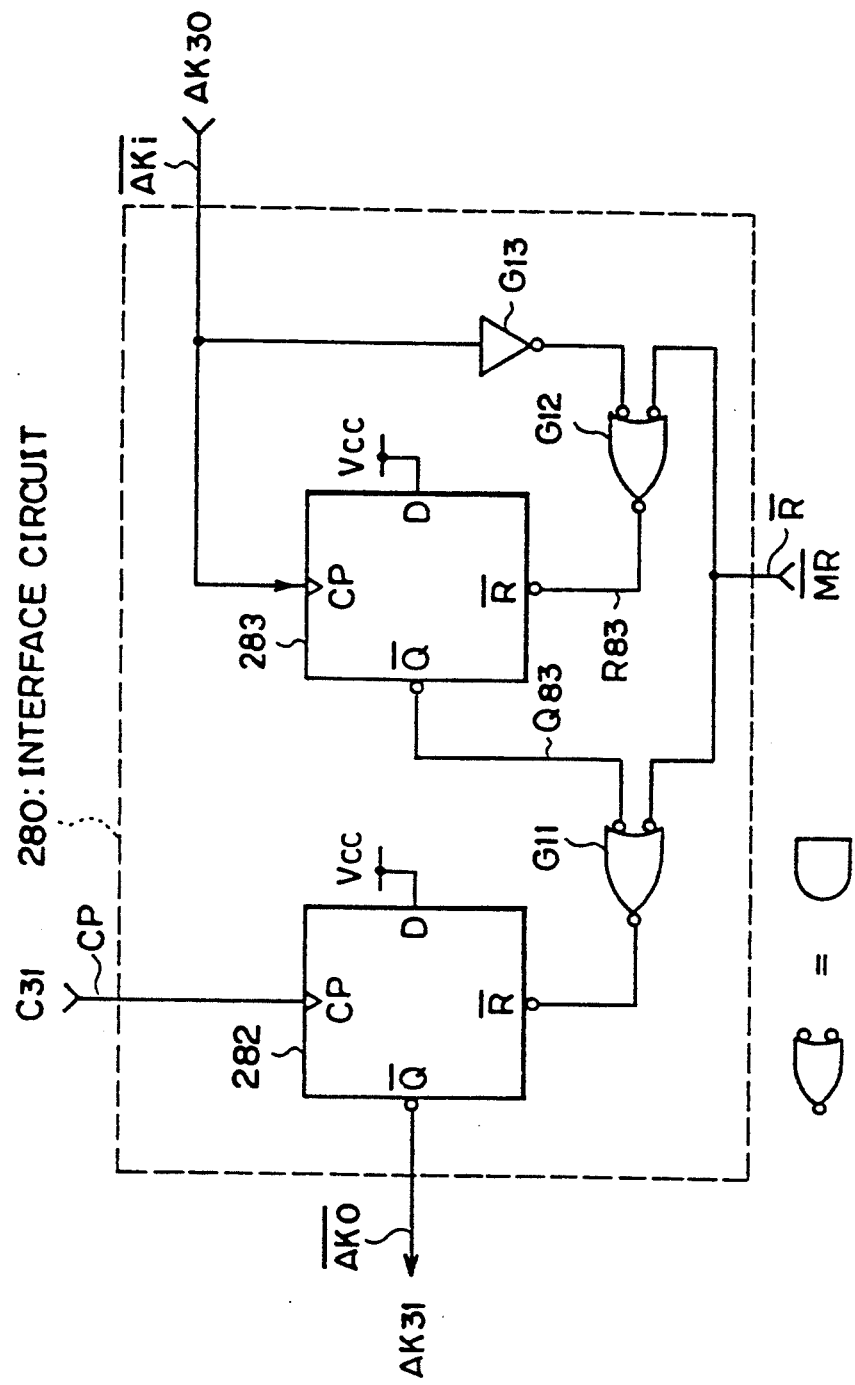
FIG. 16 is a circuit diagram showing a structure of the interface circuit shown in FIG. 15.

FIG. 16 is a circuit diagram showing a structure of the interface circuit 280 shown in FIG. 15.

The interface circuit 280 includes D type flip-flops 282 and 283, AND gates G11 and G12 and an inverter G13. The transmission acknowledging signal input terminal $\overline{AKi}$ for receiving the transmission acknowledging signal AK30 is connected to a clock terminal CP of the D type flip-flop 283 and also connected to one input terminal of the AND gate G12 through the inverter G13. A reset terminal $\overline{R}$ for receiving a master reset signal $\overline{MR}$ is connected to the other input terminal of the AND gate G12 and one input terminal of the AND gate G11. An output terminal of the AND gate G12 is connected to a reset terminal $\overline{R}$ of the D type flip-flop 283. An output terminal $\overline{Q}$ of the D type flip-flop 283 is connected to the other input terminal of the AND gate G11. An output terminal of the AND gate G11 is connected to a reset terminal $\overline{R}$ of the D type flip-flop 282. A clock terminal CP for receiving the transmission signal C31 is connected to a clock terminal CP of the D type flip-flop 282. An output terminal $\overline{Q}$ of the D type flip-flop 282 is connected to a transmission acknowledging signal output terminal $\overline{AKO}$. The transmission acknowledging signal AK31 is outputted from the transmission acknowledging signal output terminal $\overline{AKO}$. Power supply potential Vcc is applied to input terminals Ds of the D type flip-flops 282 and 283.

Figure 17:
FIG. 17 is a timing chart for explaining an operation of the interface circuit of FIG. 16.

Now, referring to the timing chart of FIG. 17, an operation of the interface circuit of FIG. 16 will be described.

In response to the rise of the transmission signal C31 supplied from the transfer control portion 221 (FIG. 15), the transmission acknowledging signal AK31 falls to the "L" level (inhibited state). Then, when the transmission acknowledging signal AK30 supplied from the transfer control portion 231 (FIG. 15) falls to the "L" level (inhibited state), a rest signal R83 supplied to the D type flip-flop 283 from the AND gate 12 rises to the "H" level, and thereafter, the transmission acknowledging signal AK30 rises to the "H" level (authorized state). In response to the rise of the transmission acknowledging signal AK30, an output signal Q83 outputted from the D type flip-flop 283 falls to the "L" level, whereby the output of the AND gate G11 falls to the "L" level to reset the D type flip-flop 282. As a result, the transmission acknowledging signal AK31 rises to the "H" level (authorized state).

On the other hand, in response to the rise of the transmission acknowledging signal AK30, the output of the inverter G13 falls to the "L" level and the reset signal R83 outputted from the AND gate G12 falls to the "L" level. As a result, the D type flip-flop 283 is reset, so that the output signal Q83 rises to the "H" level.

As the foregoing, in response to the rise of the transmission signal C31 supplied from the transfer control portion 221, the interface circuit 280 causes the transmission acknowledging signal AK31 to be supplied to the transfer control portion 221 to attain the "L" level and holds the transmission acknowledging signal AK31 to the "L" level until the transmission acknowledging signal AK30 rises to the "H" level.

Figure 18:
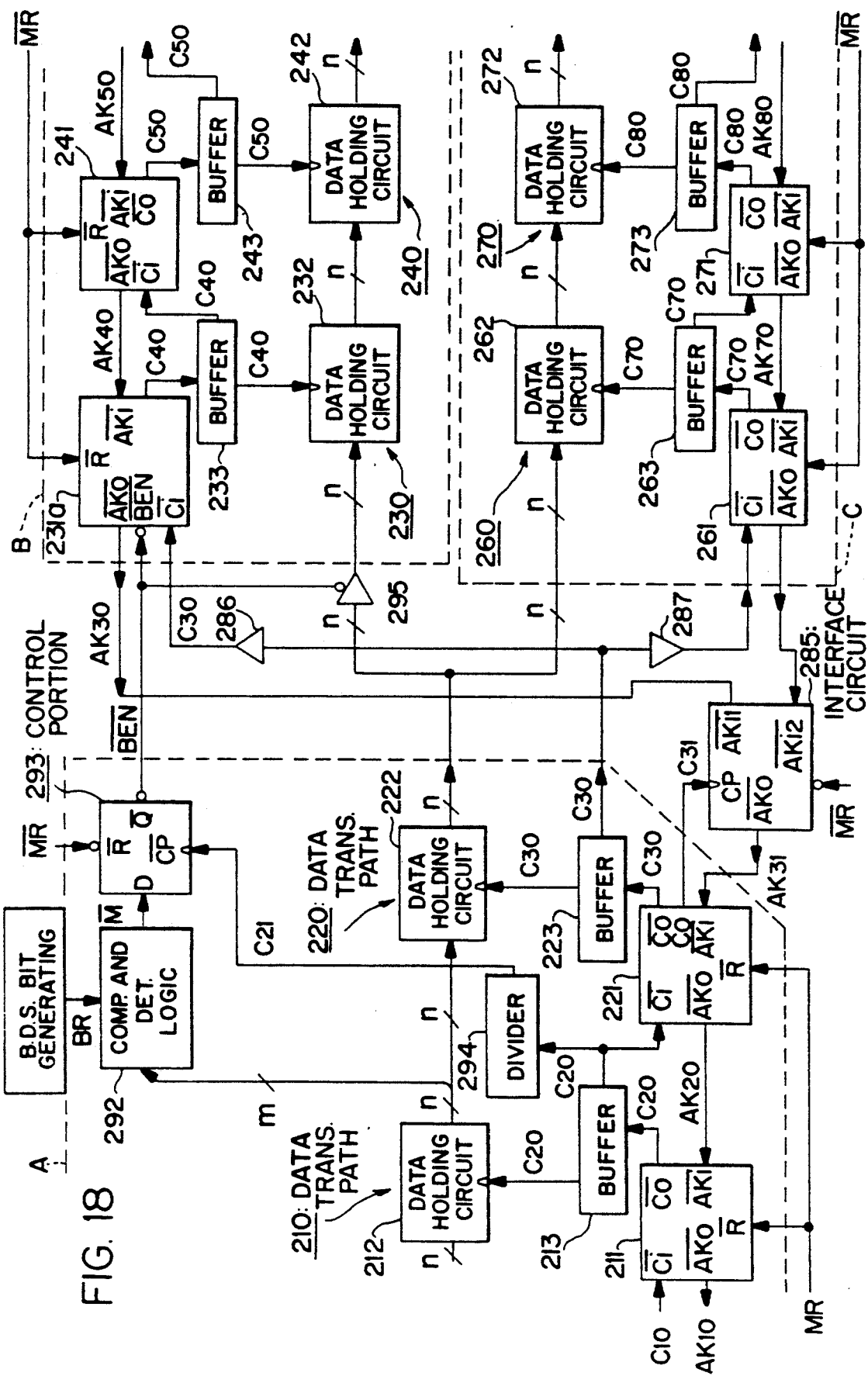
FIG. 18 is a block diagram showing a structure of an interface apparatus according to a fourth embodiment of the present invention.

FIG. 18 is a block diagram showing a structure of an interface apparatus according to a fourth embodiment of the present invention. The interface apparatus according to the embodiment shown in FIG. 18 is for controlling data transmission from a first information processor A to a second information processor B or a third information processor C.

The first information processor A includes data transmission paths 210 and 220. Structures of the data transmission paths 210 and 220 are the same as those shown in FIG. 15. The information processor B includes data transmission paths 230 and 240. The data transmission path 230 is provided with a transfer control portion 231a in place of the transfer control portion 231 shown in FIG. 15. The structures of the other portions of the data transmission path 230 and the structure of the data transmission path 240 are the same as those shown in FIG. 15. The third information processor C includes data transmission paths 260 and 270. The data transmission path 260 comprises a transfer control portion 261, a data holding circuit 262 and a buffer 263, and the data transmission path 270 comprises a transfer control portion 271, a data holding circuit 272 and a buffer 273. Structures of the transfer control portions 261 and 271 are the same as that of the transfer control portion 11 shown in FIG. 4. In the present embodiment, an interface circuit 285 is provided in place of the interface circuit 280 of FIG. 15.

The data supplied to the data holding circuit 212 from the preceding stage portion (not shown) is transmitted to the data holding circuit 222. The data received by the data holding circuit 222 is transmitted only to the data holding circuit 262, or to both of the data holding circuits 232 and 262.

Figure 19:
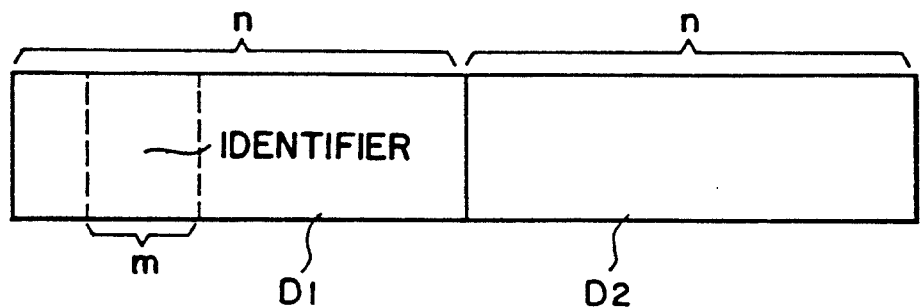
FIG. 19 is a diagram showing a structure of packet data transmitted in the embodiment of FIG. 18.

The data to be transmitted in this embodiment is packet data comprising a first word D1 of n bits and a second word D2 of n bits, as shown in FIG. 19. The first word D1 of the packet data includes an identifier of m bits. The identifier indicates whether the packet data should be transmitted only to the third information processor C or to both of the second information processor B and the third information processor C. The first word D1 and the second word D2 of the packet data are successively transmitted.

The first information processor A is further provided with a branch destination specifying bit generating portion 291, a comparison and determination logic portion 292 comprising a comparator, a control portion 293 comprising a D type flip-flop, a divider 294 comprising a D type flip-flop and a buffer 295.

A transmission signal C10 is supplied to a transfer control portion 211 from the preceding stage portion. In response to a fall of the transmission signal C10, the first word D1 of the packet data is supplied to a data holding circuit 212 from the preceding state portion. The transfer control portion 211 supplies a transmission acknowledging signal AK10 of the "L" level, (inhibited state) to the preceding stage portion. When a transmission acknowledging signal AK20 of the "H" level (authorized state) is supplied from a transfer control portion 221, the transfer control portion 211 supplies a transmission signal C20 of the "L" level to the data holding circuit 212 and the transfer control portion 221 through the buffer 213. In response to the fall of the transmission signal C20, the data holding circuit 212 latches the first word D1 of the packet data supplied from the preceding stage portion and outputs the same.

The branch destination specifying bit generating portion 291 is preset so as to generate a predetermined branch destination specifying bit BR. The comparison and determination logic portion 292 compares the identifier included in the first word D1 of the packet data outputted from the data holding circuit 212 with the branch destination specifying bit BR supplied from the branch destination specifying bit generating portion 291, and when they are coincident with each other, it outputs a match signal $\overline{M}$ of the "L" level and when not, it outputs a match signal $\overline{M}$ of the "H" level. The match signal $\overline{M}$ is supplied to an input terminal D of the control portion 293.

The divider 294 frequency-divides the transmission signal C20 supplied through the transfer control portion 211 and the buffer 213 by two and supplies the frequency-divided signals as clock signals C21 to a clock terminal $\overline{CP}$ of the control portion 293. Every time the transmission signal C20 from the transfer control portion 211 falls twice, the clock signal C21 falls once. More specifically, every time two words pass through the data holding circuit 212, the clock signal C21 falls from the "H" level to the "L" level. In response to the fall of the clock signal C21, the control portion 293 outputs an inversion signal of the match signal $\overline{M}$ supplied to the input terminal D from an inversion output terminal $\overline{Q}$ as a control signal $\overline{BEN}$.

When the control signal $\overline{BEN}$ is at the "H" level, the buffer 295 becomes no-conductive and the transfer control portion 231 becomes inactive. On the contrary, when the control signal $\overline{BEN}$ is at the "L" level, the buffer 295 becomes conductive and the transfer control portion 231 becomes active. More specifically, in case the identifier included in the first word D1 of the packet data coincides with the branch destination specifying bit BR, the data holding circuit 222 is connected only to the data holding circuit 262. On the contrary, in case the identifier included in the first word D1 of the packet data does not coincide with the branch destination specifying bit BR, the data holding circuit 222 is connected to both a data holding circuit 232 and the data holding circuit 262. In the initial state, when a master reset signal $\overline{MR}$ of the "L" level is supplied to a reset terminal $\overline{R}$ of the control portion 293, the control signal $\overline{BEN}$ attains the "H" level. Accordingly, in the initial state, the data holding circuit 222 is connected only to the data holding circuit 262.

Then, the transfer control portion 221, when a transmission acknowledging signal AK31 of the "H" level is supplied from the interface circuit 285, supplies a transmission signal C30 of the "L" level to the data holding circuit 222 through the buffer 223, in response to the fall of the transmission signal C20. In addition, the transfer control portion 221 supplies the transmission signal C30 to the transfer control portion 231a through the buffer 221 and a buffer 286, and also to the transfer control portion 261 through the buffer 223 and a buffer 287. In response to the fall of the transmission signal C30, the data holding circuit 222 latches the first word D1 of the packet data supplied from the data holding circuit 212 and outputs the same. Subsequently to the first word D1, the second word D2 is similarly latched in the data holding circuit 212 and outputted therefrom.

When the control signal $\overline{BEN}$ is at the "H" level, the first word D1 of the packet data outputted from the data holding circuit 222 is supplied only to the data holding circuit 262. This is called "branch". In response to the fall of the transmission signal C30, the transfer control portion 261 supplies a transmission signal C70 of the "L" level to the data holding circuit 262 and the transfer control portion 271 through the buffer 263. In response to the fall of the transmission signal C70, the data holding circuit 262 latches the first word D1 of the packet data supplied from the data holding circuit 222 and outputs the same. The second word D2 of the packet data is similarly latched in the data holding circuit 222 and outputted therefrom. On this occasion, since the control signal $\overline{BEN}$ is held at the "H" level, the second word D2 of the packet data outputted from the data holding circuit 222 is supplied only to the data holding circuit 262. The first word D1 of the packet data outputted from the data holding circuit 262 is similarly latched in the data holding circuit 272 and outputted therefrom. In addition, the second word D2 of the packet data outputted from the data holding circuit 222 is similarly latched in the data holding circuit 262 and outputted therefrom.

On the contrary, in case the control signal $\overline{BEN}$ outputted from the control portion 293 is at the "L" level, the first word D1 of the packet data outputted from the data holding circuit 222 is supplied to both the data holding circuits 232 and 262. This is called "shunt". The first word D1 of the packet data supplied to the data holding circuit 232 is latched in the data holding circuit 232 and outputted therefrom, and thereafter latched in a data holding circuit 242 and outputted therefrom. In the same manner, the first word D1 of the packet data supplied to the data holding circuit 262 is latched in the data holding circuit 262 and outputted therefrom, and thereafter latched in the data holding circuit 272 and outputted therefrom. Similarly, the second word D2 of the packet data is supplied to the data holding circuits 232 and 262 through the data holding circuit 222 and thereafter supplied to the data holding circuit 242 and the data holding circuit 272, respectively.

The interface circuit 285, in response to the rise of the transmission signal C31 supplied from the transfer control portion 221, lowers the transmission acknowledging signal AK31 to be supplied to the transfer control portion 221 to the "L" level (inhibited state). Then, at a time point where both of a transmission acknowledging signal AK30 supplied from the transfer control portion 231a and a transmission acknowledging signal AK60 supplied from the transfer control portion 261 rise to the "H" level, the interface circuit 285 raises the transmission acknowledging signal AK31 to be supplied to the transfer control portion 221 to the "H" level (authorized state).

Accordingly, even if a signal on an interconnection path between the first information processor A and the second information processor B and a signal on an interconnection path between the first information processor A and the second information processor C differs in time period required for signal transmission, it is possible to autonomously adjust timing skew of the signals on the interconnection paths.

Figure 20:
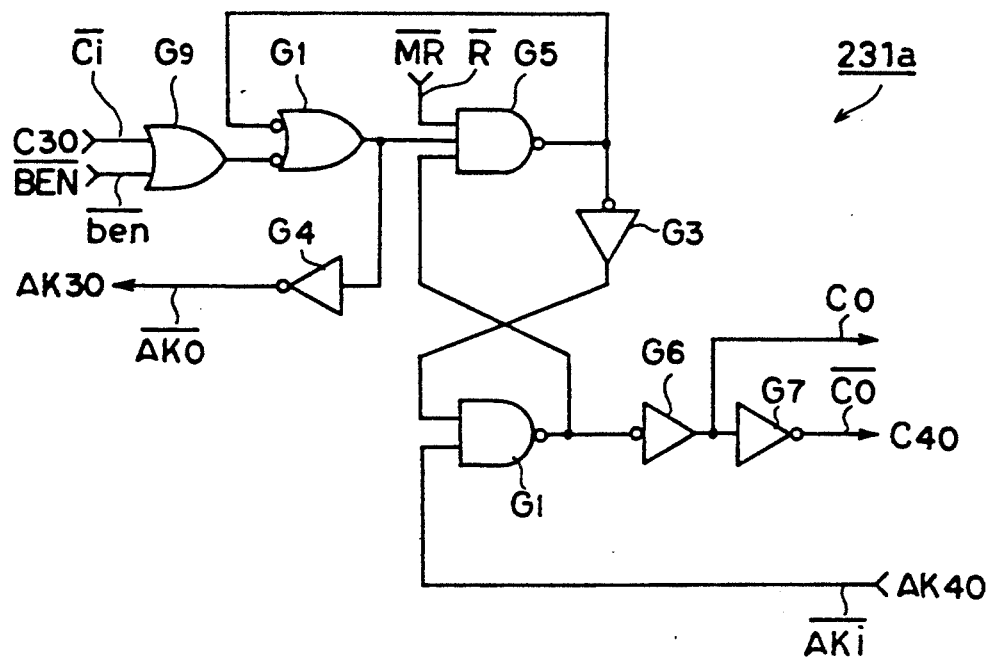
FIG. 20 is a circuit diagram showing a structure of the transfer control portion shown in FIG. 18.

FIG. 20 is a circuit diagram showing a detailed structure of the transfer control portion 231a shown in FIG. 18.

The transfer control portion 231a of FIG. 20 is further provided with an OR gate G9. One input terminal of the OR gate G9 is connected to a transmission signal input terminal $\overline{Ci}$ and the other input terminal is connected to a control signal input terminal $\overline{ben}$. The transmission signal C30 is supplied to the transmission signal input terminal $\overline{C}$ from the transfer control portion 221 (FIG. 18). The control signal $\overline{BEN}$ is supplied to the control signal input terminal $\overline{ben}$ from the control portion 293 (FIG. 18). The transmission acknowledging signal AK30 is outputted from the transmission acknowledging signal output terminal $\overline{AKO}$. In addition, a transmission signal C40 is outputted from the transmission signal output terminal $\overline{CO}$ and a transmission acknowledging signal AK40 is supplied to the transmission acknowledging signal input terminal $\overline{AKi}$ from a transfer control portion 241 in the succeeding stage (FIG. 18). Structures of the other portions are the same as those of the transfer control portion 11 of FIG. 4.

With respect to the operation of the transfer control portion 231a of FIG. 20, waveforms of the transmission signal C10 shown in FIGS. 7 and 8 correspond to a waveform of an output of the OR gate G9. Accordingly, when the control signal $\overline{BEN}$ is at the "L" level, the operation shown in FIGS. 7 and 8 is performed.

Figure 21:
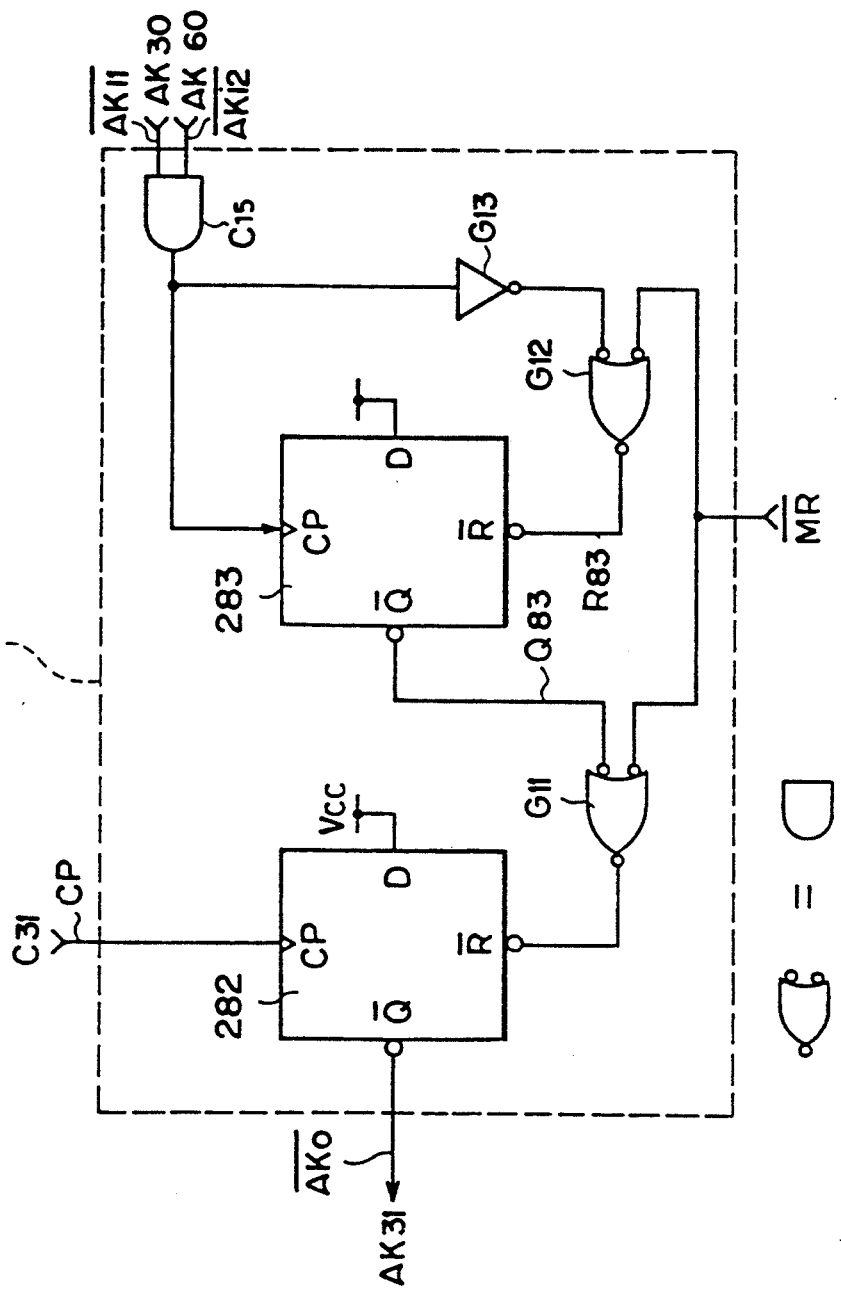
FIG. 21 is a circuit diagram showing a structure of the interface circuit shown in FIG. 18.

FIG. 21 is a circuit diagram showing a detailed structure of the interface circuit 285 shown in FIG. 18.

The structure of the interface circuit 285 of FIG. 21 is the same as that of the interface circuit 280 of FIG. 16 except that the interface circuit 285 of FIG. 21 is further provided with an AND gate G15. One input terminal of the AND gate G15 is connected to a transmission acknowledging signal input terminal $\overline{AKi1}$ for receiving the transmission acknowledging signal AK30 supplied from the transfer control portion 231a (FIG. 18) and the other input terminal is connected to a transmission acknowledging signal input terminal $\overline{AKi2}$ for receiving the transmission acknowledging signal AK60 supplied from the transfer control portion 261 (FIG. 18). An output terminal of the AND gate G15 is connected to a clock terminal CP of the D type flip-flop 283 and an input terminal of the inverter G13.

Figure 22:
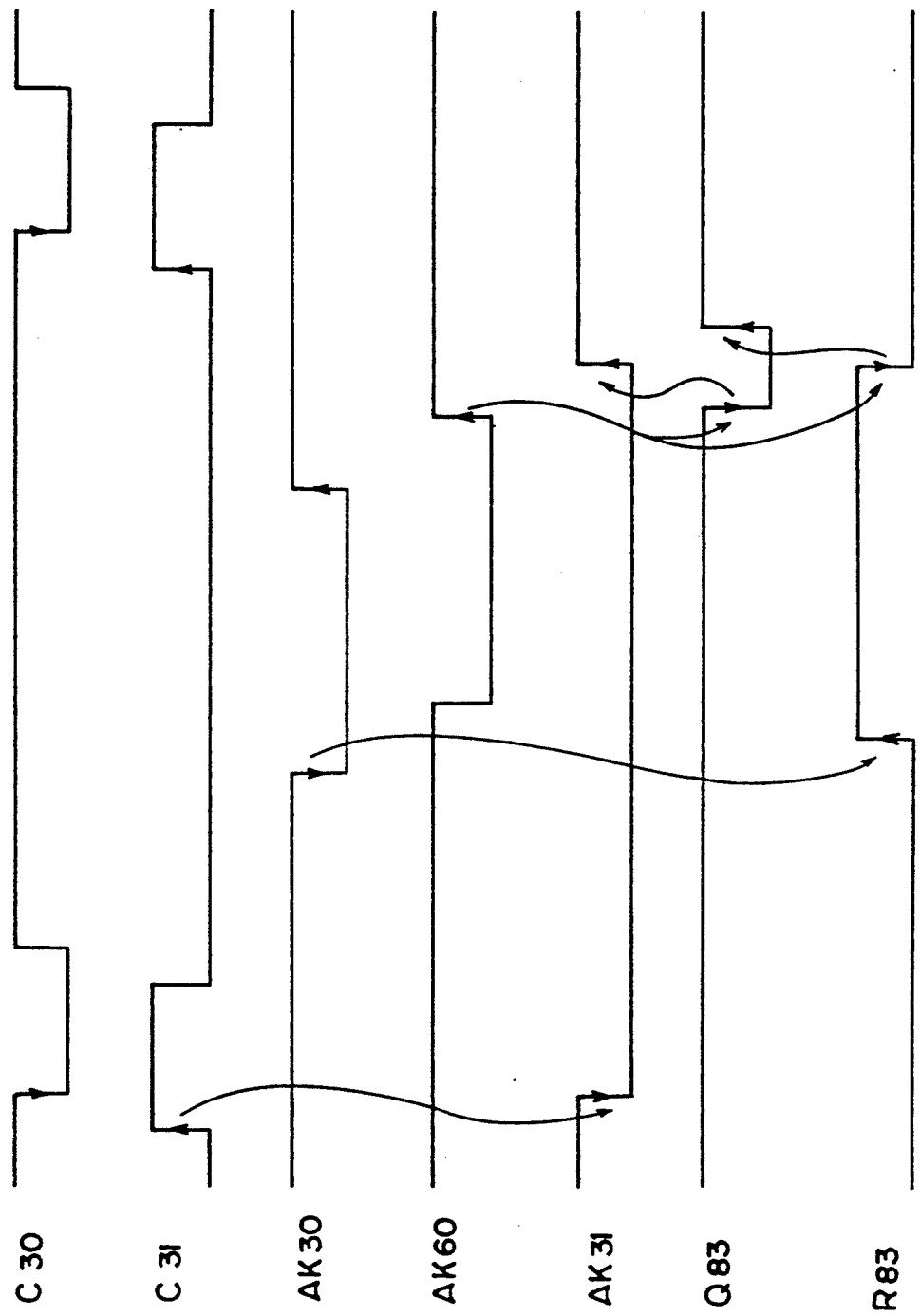
FIG. 22 is a timing chart for explaining an operation of the interface circuit of FIG. 21.

Now, referring to the timing chart of FIG. 22, an operation of the interface circuit 285 of FIG. 21 will be described.

Figure 1:
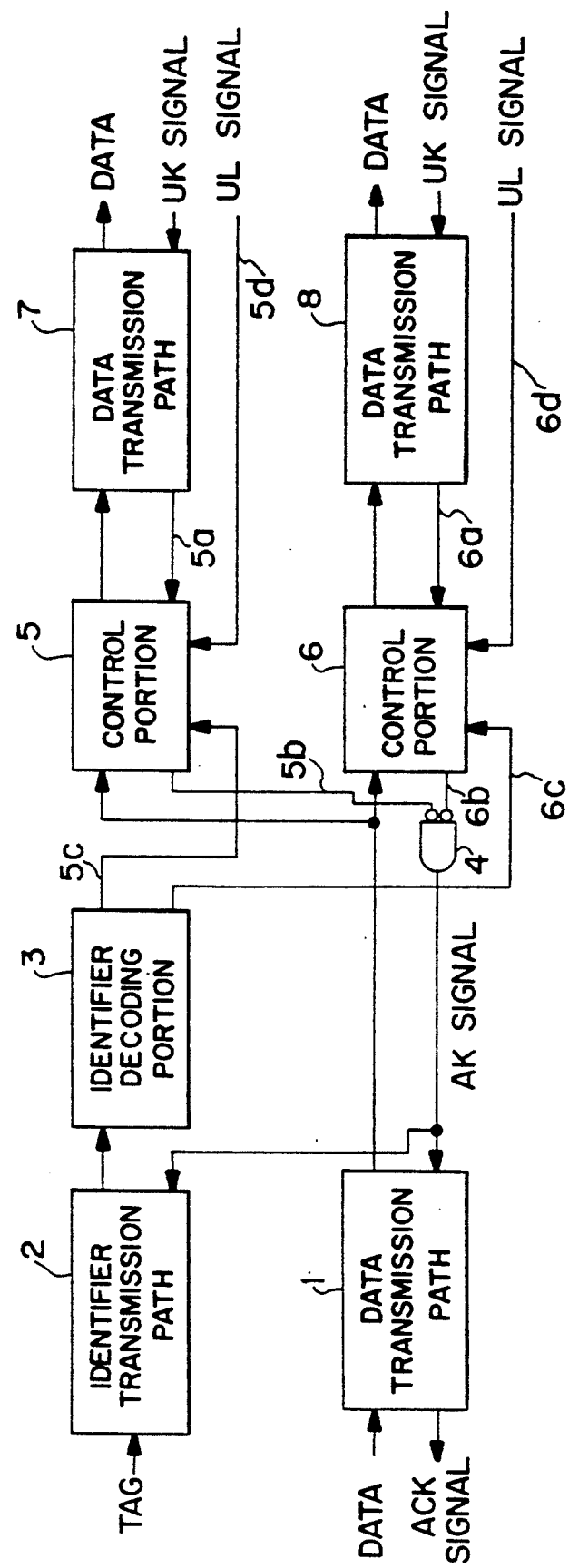
FIG. 1 is a diagram showing one example of a structure of a conventional data transmission apparatus.

First, in response to the rise of the transmission signal C31 supplied from the transfer control portion 221 (FIG. 18), the transmission acknowledging signal AK31 to be supplied to the transfer control portion 221 falls to the "L" level (inhibited state). Then, the transmission acknowledging signal AK30 supplied from the transfer control portion 231a (FIG. 18) and the transmission acknowledging signal AK60 supplied from the transfer control portion 261 (FIG. 1)) falls to the "L" level. It is assumed here that the transmission acknowledging signal AK30 falls earlier than the transmission acknowledging signal AK60. Consequently, the output of the AND gate G15 falls to the "L" level. As a result, the reset circuit R83 outputted from the AND gate G12 rises to the "H" level.

Thereafter, the transmission acknowledging signal AK30 and the transmission acknowledging signal AK60 rises to the "H" level. It is assumed here that the transmission acknowledging signal AK60 rises later than the transmission acknowledging signal AK30. In response to the rise of the transmission acknowledging signal AK60, the output of the AND gate G15 rises to the "H" level. Consequently, the output signal Q83 from the D type flip-flop 283 falls to the "L" level. In response to the fall of the output signal Q83, the output of the AND G11 falls to the "L" level. As a result, the D type flip-flop 282 is reset, so that the transmission acknowledging signal AK31 rises to the "H" level (authorized state).

On the other hand, in response to the rise of the transmission acknowledging signal AK60, the output of the inverter G13 falls to the "L" level and the reset signal R83 outputted from the AND gate G12 falls to the "L" level. As a result, the D type flip-flop 283 is reset, so that the output signal Q83 rises to he "H" level.

As the foregoing, in response to the rise of the transmission signal C31, the interface circuit 285 lowers the transmission acknowledging signal AK31 to the "L" level, and thereafter at the time point where both the transmission acknowledging signals AK30 and AK60 fall to the "H" level, the interface circuit 285 raises the transmission acknowledging signal AK31 to the "H" level.

Accordingly, after the data is sent from the data holding circuit 222 to either or both of the data holding circuits 232 and 262, additional data transmission from the data holding circuit 222 to the data holding circuits 232 and 262 is inhibited until both the transfer control portions 231a and 261 enter a state where they can receive data.

Figure 23:
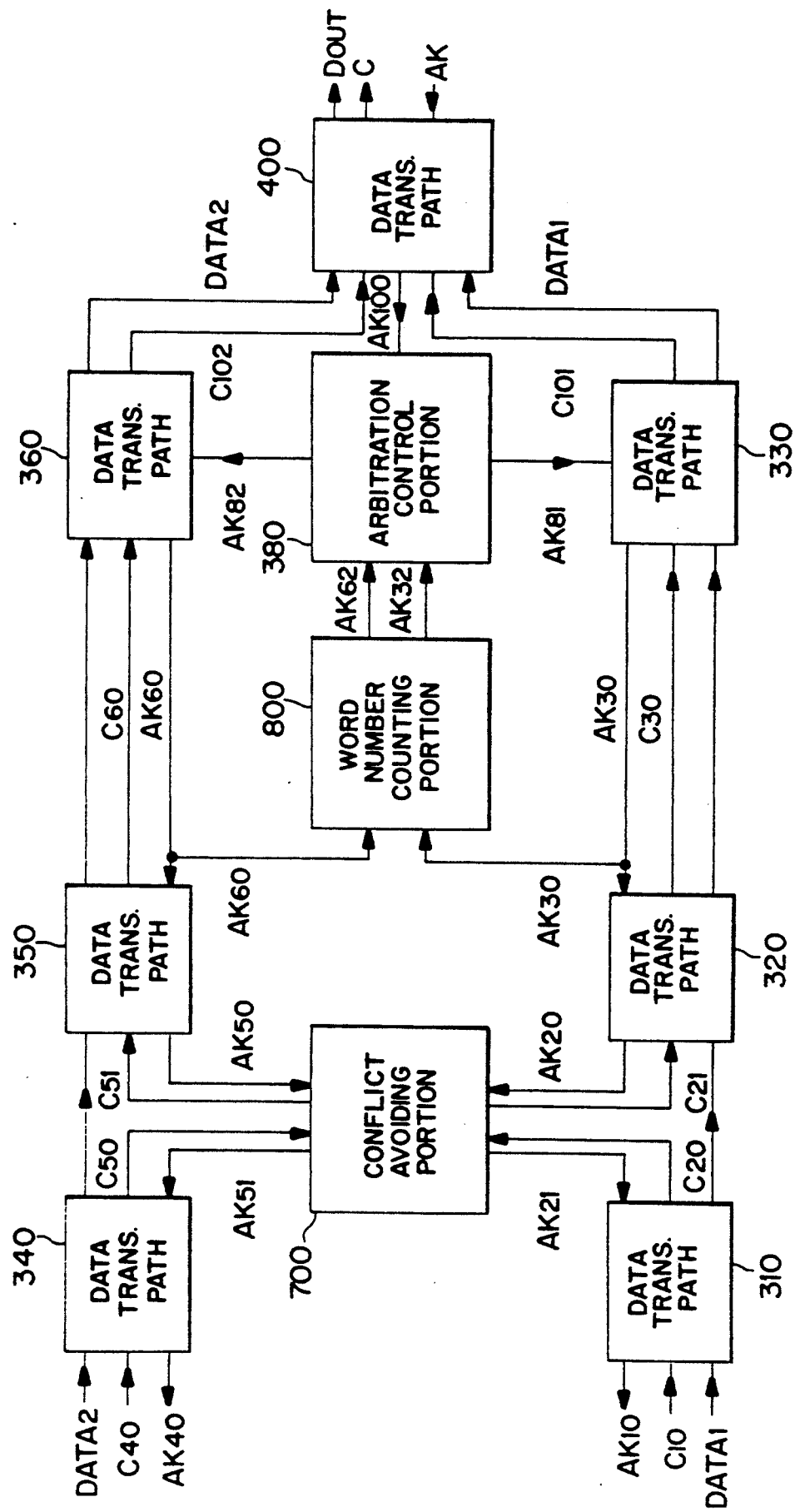
FIG. 23 is a block diagram showing a structure of a data transmission apparatus according to a fifth embodiment of the present invention.

FIG. 23 is a block diagram showing a structure of a data transmission apparatus according to a fifth embodiment of the present invention.

The data transmission apparatus according to the present embodiment is the improvement of the data transmission apparatus disclosed in the copending U.S. application Ser. No. 260,068, filed Oct. 20, 1988.

According to this data transmission apparatus, packet data comprising an arbitrary number of words is transmitted. In this embodiment, it is assumed that the packet data comprises two words.

In FIG. 23, provided in parallel are an input-side transmission path comprising data transmission paths 310, 320, and 330, and an input-side transmission path comprising data transmission paths 340, 350 and 360. A data transmission path 400 is included in an output-side transmission path. The data transmission apparatus according to the present embodiment is provided with an arbitration control portion 380, a conflict avoiding portion 700 and a word number counting portion 800. A transmission acknowledging signal AK30 outputted from the data transmission path 330 and a transmission acknowledging signal AK60 outputted from the data transmission path 360 are supplied to the word number counting portion 800. The word number counting portion 800 outputs transmission acknowledging signals AK32 and AK62 obtained by frequency-dividing these transmission acknowledging signals AK30 and AK60 by two.

The transmission acknowledging signals AK32 and AK62 outputted from the word number counting portion 800 ar supplied to the arbitration control portion 380. The arbitration control portion 380, in response to a transmission acknowledging signal AK100 from the data transmission path 400 which is the output-side transmission path, arbitrates the order of outputs of packet data from the input-side transmission paths such that the packet data is transmitted to the data transmission path 400 on packet data basis comprising a plurality of words, based on a state of each packet data on the parallel provided input-side transmission paths.

The conflict avoiding portion 700 is provided for sending the packet data to the succeeding stage portion in the order of arrival when the packet data arrives at the data transmission path 310 and 340 at a short time interval. The provision of the conflict avoiding portion 700 is the improvement of the present invention. Before describing the conflict avoiding portion 700 in detail, a general operation of this embodiment will be described.

In the initial state, the data transmission path 400 is in a state where the packet data can be received. Therefore, the transmission acknowledging signal AK100 indicating that the data can be received is supplied from the data transmission path 400 to the arbitration control portion 380. In response to the transmission acknowledging signal AK100, the arbitration control portion 380 supplies a transmission acknowledging signal AK81 to the data transmission path 330 or a transmission acknowledging signal AK82 to the data transmission path 360. The transmission acknowledging signal AK81 or AK82 authorizes only one of the data transmission path 330 or 360 to transmit the data to the data transmission path 400. Now it is considered that for example, the data transmission path 360 is authorized to transmit the data to the data transmission path 400 and the data transmission path 330 is inhibited from transmitting the data to the data transmission path 400.

First, the transmission signal C10 is supplied to the data transmission path 310 and a head word of packet data 1 arrives at the data transmission path 310. The transmission acknowledging signal AK10 is in a transmission authorized state until the packet data and the transmission signal C10 are transmitted to the data transmission path 310 and when the packet data and the transmission signal C10 are transmitted to the data transmission path 310, the signal enters a state wherein the data is being received and inputs of the subsequent data and transmission signal from the preceding stage portion are inhibited. The head word is transmitted to the data transmission path 330 through the data transmission path 320. On this occasion, a transmission acknowledging signal AK30 outputted from the data transmission path 330 is supplied to the word number counting portion 800. Similarly, a second word of the packet data 1 is transmitted to the data transmission path 320. The word number counting portion 800 counts the number of words passing through the data transmission path 320 and generates a pulse for every packet data unit to transmit the same to the arbitration control portion 380.

When there is no data in the data transmission path 360, the arbitration control portion 380 authorizes by means of the transmission acknowledging signal AK81, the data transmission path 330 to transmit the packet data to the data transmission path 400 and inhibits the data transmission path 360 to transmit the packet data to the data transmission path 400. Being authorized to transmit the data to the data transmission path 400, the data transmission path 330 sequentially transmits the head word and the second word of the packet data to the data transmission path 400. When the second word of the packet data 1 has passed through the data transmission path 400, the transmission acknowledging signal AK100 for authorizing the transmission of the packet data is supplied from the data transmission path 400 to the arbitration control portion 380. As a result, the arbitration control portion 380 supplies to the data transmission path 330 the transmission acknowledging signal AK81 for authorizing the transmission of the packet data. On this occasion, the data transmission path 360 is being inhibited from transmitting the packet data and is waiting for the transmission of the packet data.

Then, a head word of the packet data 2 arrives at the data transmission path 340. Similarly, the head word is transmitted to the data transmission path 360 through the data transmission path 350. On this occasion, a transmission acknowledging signal AK60 outputted from the data transmission path 360 is supplied to the word number counting portion 800. Then, a second word of the packet data 2 is transmitted to the data transmission path 350 through the data transmission path 340 in the same manner. The word number counting portion 800 counts the number of words passing through the data transmission path 350 and generates a pulse of for every packet data unit to supply the same to the arbitration control portion 380. The arbitration control portion 380, when confirms by the transmission acknowledging signal AK30 from the data transmission path 330 that there is no data in the data transmission path 330, authorizes the data transmission path 360 to transmit the packet data to the data transmission path 400 by means of the transmission acknowledging signal AK82, and inhibits the data transmission path 330 from transmitting the packet data to the data transmission path 400. Being authorized to transmit the packet data to the data transmission path 400, the data transmission path 360 sequentially transmits the head word and the second word of the packet data 2 to the data transmission path 400. When the second word of the packet data 2 has passed through the data transmission path 400, the transmission acknowledging signal AK400 for authorizing the transmission of the packet data is supplied from the data transmission path 400 to the arbitration control portion 380. As a result, the arbitration control portion 380 again supplies to the data transmission 360 the transmission acknowledging signal AK82 for authorizing the transmission of the packet data.

Now it is assumed that the packet data 2 is inputted a little later than the packet data 1.

When the head word of the packet data 1 arrives at the data transmission path 310, the head word is transmitted to the data transmission path 330 through the data transmission path 320. On this occasion, the transmission acknowledging signal AK30 outputted from the data transmission path 330 is supplied to the word number counting portion 800. Similarly, the second word of the packet data 1 is transmitted to the data transmission path 320 through the data transmission path 310.

The word number counting portion 800 counts the number of words passing through the data transmission path 320 and generates a pulse for every packet data unit to supply the same to the arbitration control portion 380. As a result, the arbitration control portion 380 inhibits the data transmission path 360 from transmitting the packet data to the data transmission path 400. In this state, when the head word of the packet data 2 arrives at the transmission path 340, the head word is transmitted to the data transmission path 360 through the data transmission path 350 and temporarily stop there. After the second word of the packet data 1 has passed through the data transmission path 330, transmission of the packet data from the data transmission path 360 to the data transmission path 400 is authorized.

Thus, the arbitration control portion 380 controls the input-side transmission paths such that out of the packet data 1 and 2, the data late in arriving is temporarily stopped in the data transmission path 330 or 360.

Figure 24:
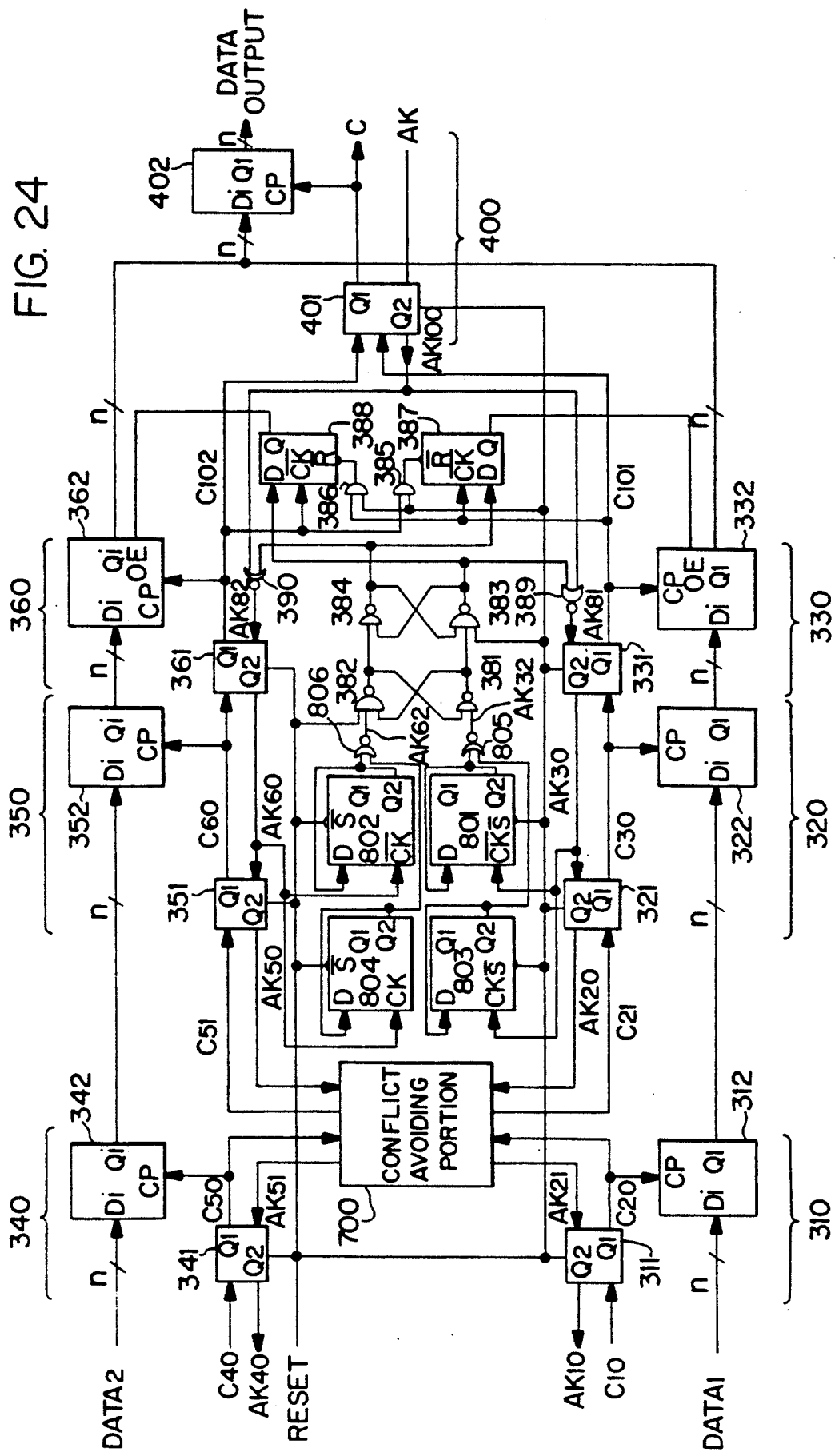
FIG. 24 is a circuit diagram showing a detailed structure of the data transmission apparatus of FIG. 23.

FIG. 24 is a concrete circuit diagram of the data transmission apparatus of FIG. 23.

The data transmission path 310 comprises a transfer control portion 311 and a data holding circuit 312. Similarly, the data transmission paths 320, 330, 340, 350 and 360 comprise a transfer control portion 321 and a data holding circuit 322, a transfer control portion 331 and a data holding circuit 332, a transfer control portion 341 and a data holding circuit 342, a transfer control portion 351 and a data holding circuit 352, and a transfer control portion 361 and a data holding circuit 362, respectively. In addition, the data transmission path 400 comprises a transfer control portion 401 and a data holding circuit 402.

Similarly to the transfer control portion shown in FIG. 4, each of the transfer control portions 311-361 performs handshaking transfer control. In addition, the transfer control portion 401 contains a function of obtaining a logical sum of two different inputted transmission signals. The transfer control portion 401 also performs the handshaking transfer control, similarly to the transfer control portions 311-361. The data holding circuits 312, 322, 332, 342, 352, 362 and 402 transfer the contents of the input terminal Di to the output terminal Qi at the fall of the clock pulse supplied to the clock terminal CP.

The arbitration control portion 380 includes NAND gates 381–384, NAND gates 385, 386, D type flip-flops 387, 388 and NOR gates 389 and 390. The D type flip-flops 387 and 388 output the contents of the input terminal D to the output terminal $\overline{Q}$ at the fall of the clock pulse supplied to the clock terminal $\overline{CK}$.

The word number counting portion 800 includes D type flip-flops 801–804 and NOR gates 805 and 806. The D type flip-flops 801 and 802 output the contents of an input terminal D to an output terminal Q1 (Q2=$\overline{Q}$) at the fall of the clock pulse supplied to the clock terminal $\overline{CK}$. The D type flip-flops 803 and 804 output the contents of the input terminal D to the output terminal Q1 (Q2=$\overline{Q}$) at the rise of the clock pulse supplied to the clock terminal CK.

Now, operation of the data transmission apparatus shown in FIG. 24 will be described.

In the initial state, a reset signal RESET of the "L" level is supplied to the transfer control portions 311, 321, 331, 341, 351, 361, and 401, the AND gates 385 and 386, the NAND gate 382 and 383, and the D type flip-flops 801, 802, 803 and 804. As a result, the transfer control portions 311, 321, 331, 341, 351 and 361 are initially reset, so that outputs from the respective output terminals Q1 attain the "H" level and outputs of the respective output terminals Q2 also attain the "H" level. In addition, the transfer control portion 401 is reset, so that the output from the output terminal Q1 attains the "H" level and the output from the output terminal Q2 also attains the "L" level. The D type flip-flops 801–804 are also reset, so that the outputs from the respective output terminals Q1 attain the "H" level and the outputs from the respective output terminals Q2 attain the "L" level. The D type flip-flops 387 and 388 are also reset, so that the outputs from the respective output terminals $\overline{Q}$ attain the "L" level.

Furthermore, in response to the reset signal RESET, the output of the NAND gate 382 attains the "H" level and which output is supplied to one input terminal of the NAND gate 381. Since the outputs from the output terminal Q2 of the D type flip-flops 801 and 803 are at the "L" level, a potential of the other input terminal of the NAND gate 381 attains the "H" level. Therefore, the output of the NAND gate 381 attains the "L" level. In this state, the flip-flop comprising the NAND gates 381 and 382 in the preceding stage is stabilized.

In addition, the flip-flop comprising the NAND gates 383 and 384 in the succeeding stage receives an output of the flip-flop in the preceding stage and the NAND gate 383 receives the reset signal RESET. Therefore, the output of the NAND gate 383 attains the "H" level, and the output of the NAND gate 384 attains the "L" level. In this state, the flip-flop in the succeeding stage is also stabilized.

The output of the NAND gate 383 is supplied to the input terminal of the NOR gate 389. As a result, the transmission acknowledging signal AK81 outputted from the NOR gate 389 attains the "L" level. As a result, the data transmission path 330 is inhibited from transmitting the packet data to the data transmission path 400. The output of the NAND gate 384 is supplied to the input terminal of the NOR gate 390. Consequently, the transmission acknowledging signal AK82 outputted from the NOR gate 390 attains the "H" level. As a result, the data transmission path 360 is authorized to transmit the packet data to the data transmission path 400.

It is assumed that in this state, the transmission signal C10 which is a pulse signal of the "L" level is supplied to the transfer control portion 311 and the head word of the packet data 1 is supplied to the data holding circuit 312.

Since the transmission acknowledging signal AK20 from the transfer control portion 321 is at the "H" level (authorized state), the transmission signal 20 from the transfer control portion 311 falls to the "L" level. The transmission signal C20 is supplied to the conflict avoiding portion 700 to become a clock pulse of the data holding circuit 312. As a result, the head word is outputted from the output terminal Qi of the data holding circuit 312. In response to the transmission signal C20, the conflict avoiding portion 700 supplies the transmission signal C21 to the transfer control portion 321. Since the transmission acknowledging signal AK30 from the transfer control portion 331 is at the "H" level (authorized state), the transmission signal C30 outputted from the transfer control portion 321 falls to the "L" level. In response to the fall of the transmission signal C30, the head word is outputted from the output terminal Qi of the data holding circuit 320. The D-type flip-flops 801 and 803, and the NOR gate 805 frequency-divides the transmission acknowledging signal AK30 outputted from the transfer control portion 331 and supplies thus obtained the transmission acknowledging signal AK32 to the NAND gate 381. By inputting to the NAND gate 381 the signal obtained by arbitrarily frequency-dividing the transmission acknowledging signal AK30 from the transfer control portion 331, it is possible to arbitrate data (packet data) on a packet unit basis each packet unit comprising an arbitrary number of words.

When the transmission acknowledging signal AK32 outputted from the NOR gate 805 attains the "L" level, the output of the NAND gate 381 changes from the "L" level to the "H" level. As a result, all the inputs of the NAND gate 382 attain the "H" level and the output thereof attains the "L" level. In this state, the flip-flop in the preceding stage is stabilized. In addition, the output of the NAND gate 384 attains the "H" level and the output of the NAND gate 383 attains the "L" level. In this state, the flip-flop in the succeeding stage is stabilized. Therefore, the transmission acknowledging signal AK81 from the NOR gate 389 attains the "H" level (authorized state). As a result, the head word of the packet data 1 supplied to the input terminal Di of the data holding circuit 332 is outputted from its output terminal Qi.

When a transmission acknowledging signal AK supplied from the transfer control portion (not shown) in a stage subsequent to the transfer control portion 401 is at the "H" level (authorized state), the head word of the packet data supplied to the input terminal Di of the data holding circuit 402 is outputted from its output terminal Qi.

Subsequently to the first word, the second word of the packet data 1 is outputted from the output terminal Qi of the data holding circuit 402 through the data holding circuits 312, 322 and 332.

Meanwhile, while a transmission signal C101 of the "L" level is outputted from the transfer control portion 331 to the transfer control portion 401, an output of the "H" level of the NAND gate 384 is held as an output of the flip-flop in the succeeding stage and supplied to the NOR gate 390. Therefore, a transmission acknowledging signal AK82 outputted from the NOR gate 390 is held at the "L" level to inhibit the transfer control portion 361 from transmitting the data to the transfer control portion 401. In addition, since the output of the transfer control portion 331 causes the output of the D-type flip-flop 388 to attain the "L" level, the output terminal Qi of the data holding circuit 362 enters a high impedance state. Therefore, the output from the output terminal Qi of the data holding circuit 332 does not conflict with the output from the output terminal Qi of the data holding circuit 362.

As the foregoing, the packet data 1 comprising two words is transmitted to the data holding circuit 402 through the data holding circuits 312, 322 and 332.

On the other hand, when a transmission signal C40 of the "L" level is supplied to the transfer control portion 341 and the packet data 2 is supplied to the data holding circuit 342, the packet data 2 is transmitted to the data holding circuit 402 through the data holding circuits 352 and 362 in the same manner as described above.

Now it is assumed that after the initial state, packet data 1 is inputted and after a lapse of a predetermined time period the packet data 2 is inputted.

A transmission signal C10 of the "L" level is supplied to the transfer control portion 311 and the head word of the packet data 1 is supplied to the data holding circuit 312, and a little later the transmission signal C40 of the "L" level is supplied to the transfer control portion 341 and the head word of the packet data 2 is supplied to the data holding circuit 342. As a result, a transmission acknowledging signal AK32 outputted from the NOR gate 805 changes from the "H" level to the "L" level. As a result, an output of the NOR gate 381 changes from the "L" level to the "H" level. In this state, the flip-flop in the preceding stage is stabilized. In addition, an output of the NAND gate 384 attains the "H" level and an output of the NAND gate 383 attains the "L" level. In this state, the flip-flop in the succeeding stage is stabilized.

The output of the NAND gate 383 is supplied to the NOR gate 389, whereby the transfer control portion 331 is authorized to transmit the data. On this occasion, the output of the NAND gate 384 is supplied to the NOR gate 390, whereby the transfer control portion 361 is inhibited from transmitting the data. After the transmission signal C101 corresponding to two words of the packet data 1 is transmitted from the transfer control portion 331 to the transfer control portion 401, the transfer control portion 361 is authorized to transmit the data.

Also in case the packet data 1 is inputted a little later than the packet data 2, the transfer control is similarly performed. As the foregoing, in case the packet data 1 and the packet data 2 conflict with each other to be inputted, the flip-flop comprising the NAND gates 381 and 382 and the flip-flop comprising the NAND gates 383 and 384 temporarily stop the packet data which is inputted later.

As described above, according to this data transmission apparatus, with the output-side transmission path 400 being empty, if only the packet data 1 exists and no packet data 2 exists, the packet 1 is sequentially outputted. If only the packet data 2 exists and no packet data 1 exists, the packet data 2 is sequentially outputted.

On the other hand, when the packet data 1 and the packet data 2 are transmitted through the input-side transmission paths at their largest transfer capacity, the data transmission path 400 can not process these packet data simultaneously. Therefore, the packet data stays in the data transmission paths 330, 320, 310 and 360, 350 and 340. In this case, the data transmission path 330 and the 360 in turn transmit the packet data thereof to the data transmission path 400 on a packet basis each packet including two words.

In this embodiment, a conflict avoiding portion 700 is provided for the following reason.

Figure 25:
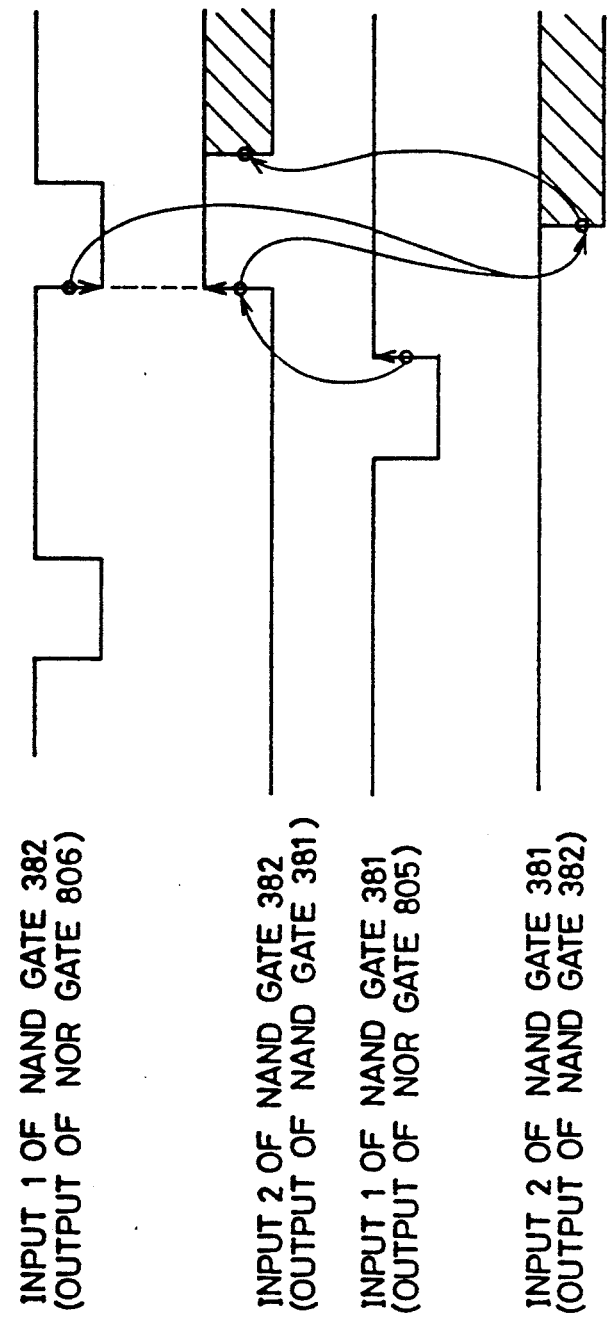
FIG. 25 is a timing chart for explaining a logically unsettled state in an arbitration control portion.

In case the arbitration control portion 380 shown in FIG. 23 comprises the flip-flop including the NAND gates 381 and 382 and the flip-flop comprising the NAND gates 383 and 384, as shown in FIG. 24, there exists conflict timing of input signals which causes a logical state of outputs of these flip-flops to becomes unsettled. More specifically, as shown in the timing chart of FIG. 25, if one input of the NAND gate 382 (output of the NOR gate 806) changes simultaneously with the other input of the NAND gate 382 (output of the NAND gate 381), an output of the NAND gate 382 becomes logically unsettled.

In case each of the NAND gates 380-384 comprises, for example, a CMOS circuit, there occurs simultaneously a change from the logical "L" level to the logical "H" level and its reverse change. Therefore, in such logically unsettled state as described above, an output level is settled to the logical "H" level or to the logical "L" level, or an intermediate level between both the levels. Accordingly, a final state is probabilistically determined out of such three types of levels.

In this case, while an arbitration controlling function itself is not damaged, the order of the arbitrated packet data might be different for each apparatus even though each apparatus has the same logic and circuit structure.

Therefore, it is necessary to select an apparatus satisfying such condition in an applied field requiring a plurality of pieces of packet data inputted in parallel at a short time interval to be arbitrated strictly in the order of arrival and be outputted.

Accordingly, the conflict avoiding portion 700 is provided for preventing the outputs of the NAND gates 381 and 382 shown in FIG. 24 from becoming logically unsettled by means of transmission acknowledging signals AK32 and AK62 supplied to the arbitration control portion 380. For this purpose, there is a need for avoiding conflict with respect to transmission acknowledging signals AK30 and AK60 and also transmission signals C20 and C50.

Figure 27:
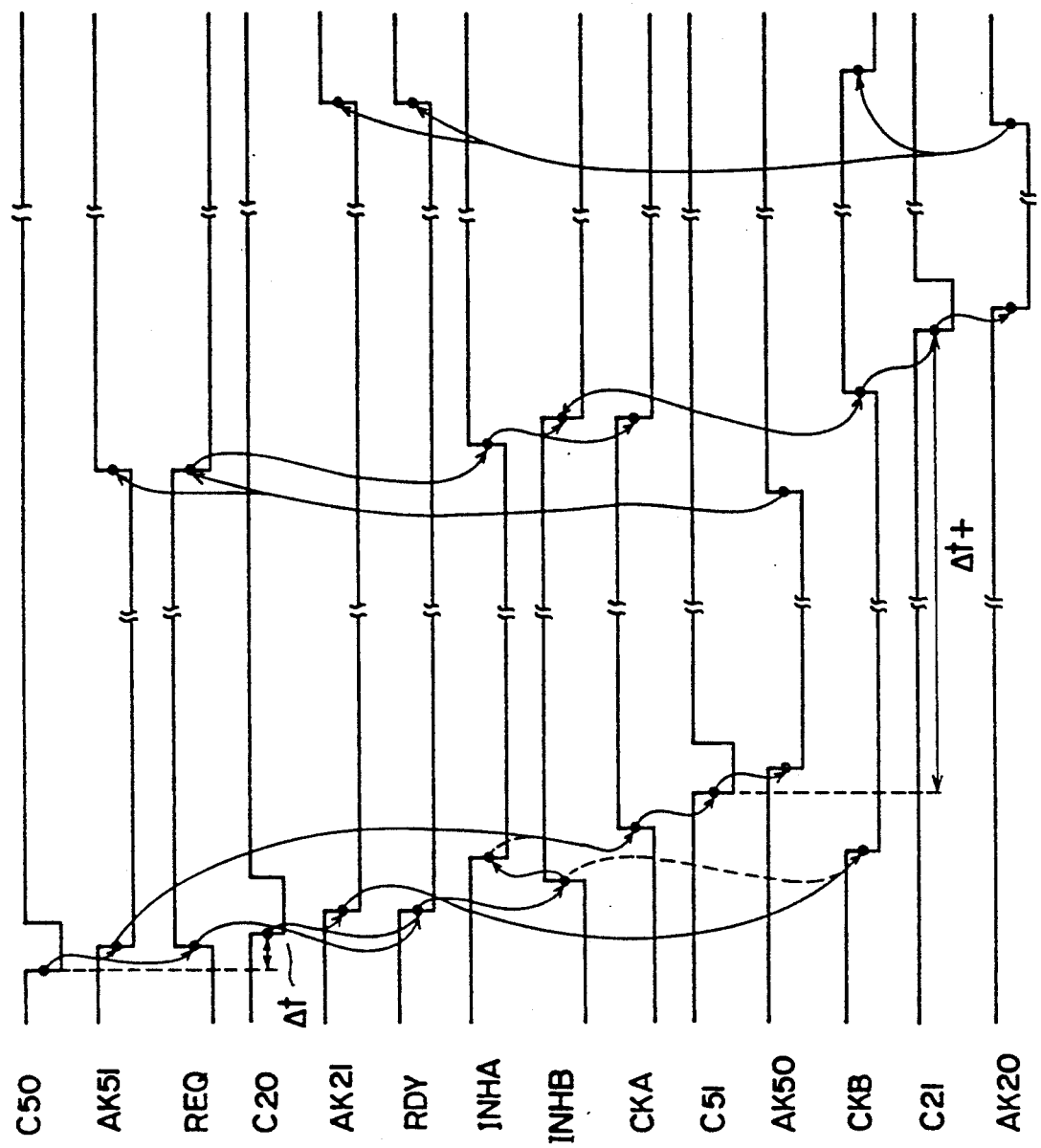
FIG. 27 is a timing chart for explaining an operation of the conflict avoiding portion of FIG. 26A.

Described with reference to the timing chart shown in FIG. 27, avoiding the conflict of the transmission signals C20 and C50 implies that the transmission signals C20 and C50 are transmitted to a subsequent data transmission path with a significant difference in time $\Delta t + \alpha$ (for example, $\Delta = 10$ ns, total 12–13 ns) provided between the transmission signals as compared with an originally slight time difference $\Delta t$ (for example 2–3 ns).

It is assumed that a time difference (time difference of conflict) which causes the above described logically unsettled state is, for example, 4–7 ns. In the data transmission apparatus according to the present invention, the logical structure shown in FIG. 4 allows a self-synchronization-type handshaking control shown in FIG. 7 (in case the transmission paths in the succeeding stage portion are empty) and FIG. 8 (in case the data transmission paths in the succeeding stage portion change from being busy to empty), so that data transfer is controlled in accordance with a state of the data transmission paths in the succeeding stage portion. Therefore, it is not possible to authorize or inhibit only a particular time difference as an input time difference of the transmission signals C20 and C50. While it is possible to apply the delay of, for example, 10 ns to one data transmission path, if packet data is supplied to the other data transmission path prior to the one data transmission path and the other data transmission path is busy, so that the packet data has to wait for 10 ns, which results in existence of timing which causes conflict by a time difference of 4–7 ns.

Figure 26A:
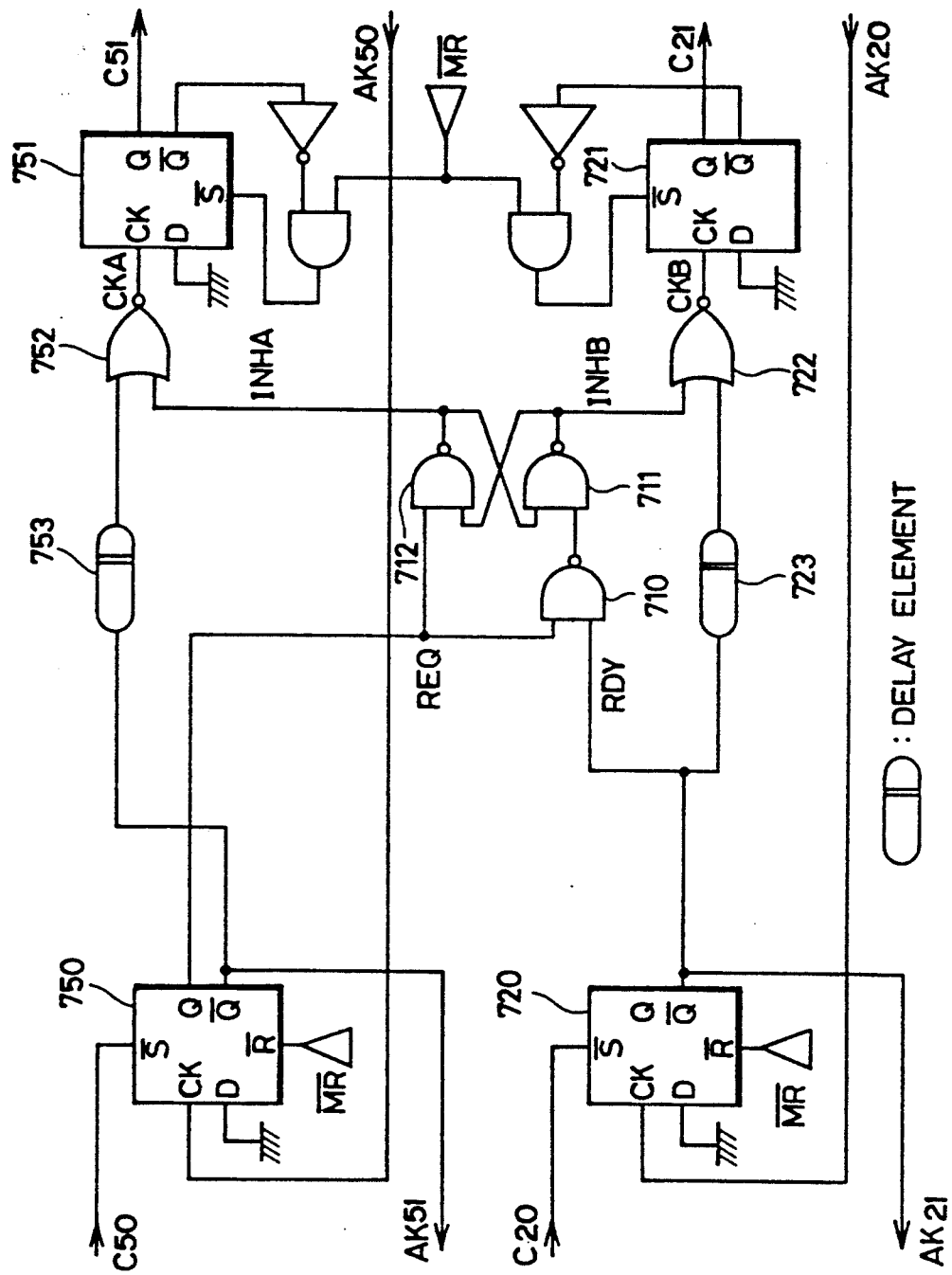
FIG. 26A is a circuit diagram showing one example of a structure of a conflict avoiding portion.
Figure 26B:
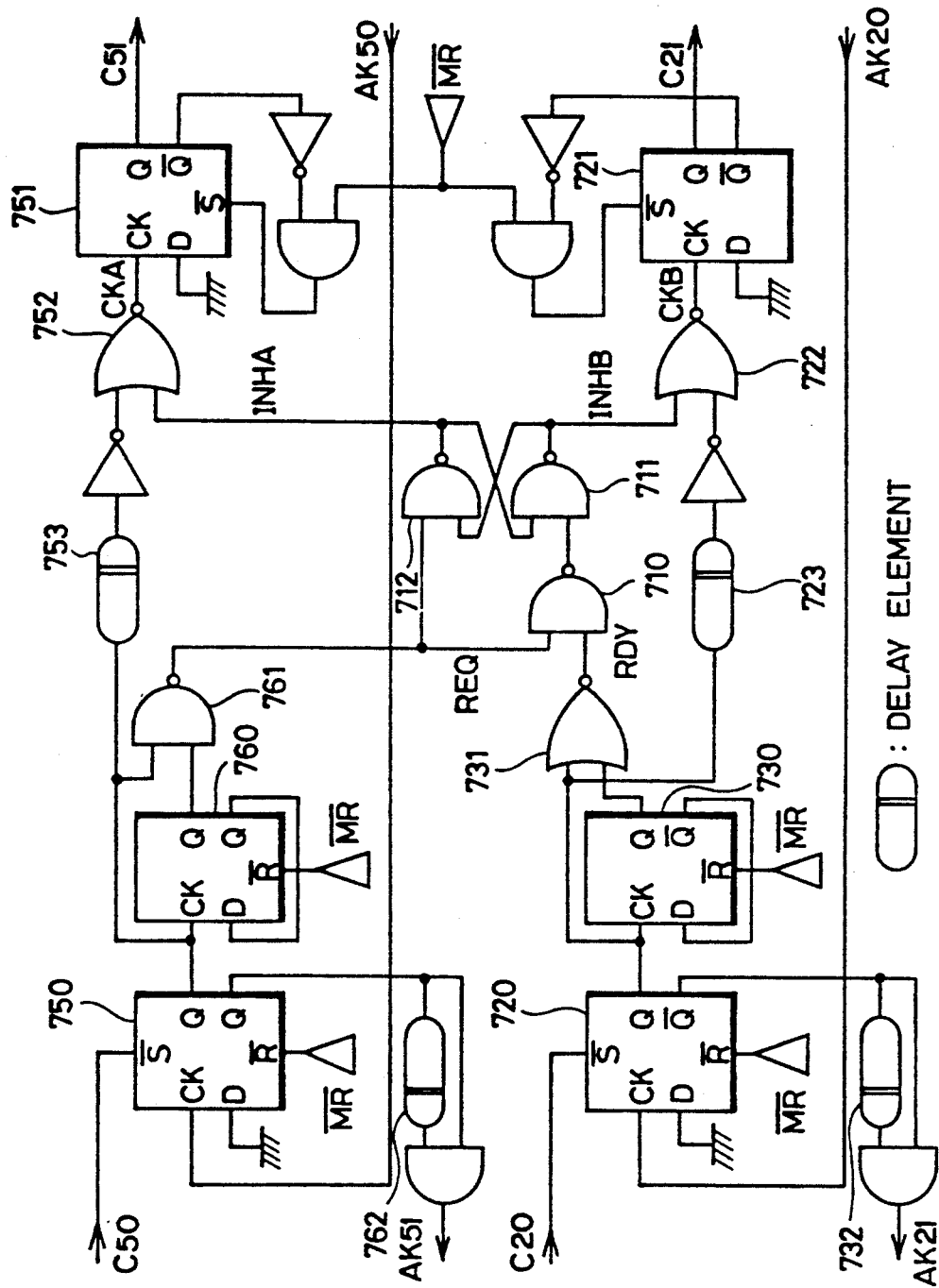
FIG. 26B is a circuit diagram showing another example of a structure of the conflict avoiding portion.

FIG. 26A is a circuit diagram showing a structure of a conflict avoiding portion 700 for avoiding conflict for every one word of the packet data. FIG. 26B is a circuit diagram showing a structure of a conflict avoiding portion 700 for avoiding conflict for every packet data comprising two words.

For the purpose of a simplicity of a description, an operation of the conflict avoiding portion 700 of FIG. 26A will be described with reference to the timing chart of FIG. 27.

Now, it is assumed that the transmission signal C50 is outputted from the data transmission path 340 (FIG. 23) a little earlier than the transmission signal C20 by a time difference $\Delta t$. On this occasion, the D-type flip-flop 750 causes a transmission acknowledging signal AK51 to fall to the "L" level to enter an inhibited state in order to keep the subsequent data waiting to be transmitted. On the other hand, a signal REQ outputted from the output terminal $\overline{Q}$ of the D-type flip-flop 750 rises to the "H" level. In this case, an output of the NAND gate 712 remains the "H" level. However, since a signal RDY outputted from the output terminal $\overline{Q}$ of the D-type flip-flop 720 is at the "H" level, an output of the NAND gate 710 falls to the "L" level. Therefore, an output INHB of the NAND gate 711 rises to the "H" level. As a result, an output INHA of the NAND gate 712 falls to the "L" level and an output CKA of the NAND gate 752 rises to the "H" level.

On the other hand, the rise of the output INHB of the NAND gate 711 to the "H" level unconditionally sets an output CKB of the NOR gate 722 to the "L" level. A series operations same as that described above are performed even if the transmission signal C20 is inputted earlier than the transmission signal C50 by a time difference Δt.

Now consider a case wherein the time difference Δt is infinitely approximate to 0. In case it is possible to consider that the signals REQ and RDY which are two inputs of the NAND gate 710 are simultaneously held at the "H" level, arbitration is performed such that an input of the transmission signal C50 is accepted and the transfer of the transmission signal C20 is postponed in accordance with the above described logical operation.

On the other hand, consider a case wherein it is considered that the signals REQ and RDY are not at the "H" level at the same time, but for example, the signal RDY quickly falls to the "L" level. In this case, the initial state is maintained and the output INHA and the output INHB remain the "H" level and "L" level, respectively. Accordingly, the output CKA of the NOR gate 752 does not change from the "L" level. As a result, the input of the transmission signal C50 is temporarily kept waiting. On this occasion, in response to the input of the transmission signal C20, the output CKB of the NOR gate 722 rises to the "H" level. As a result, the input of the transmission signal C20 is accepted.

In this embodiment, α is determined by a time period required for completing the transfer of the previously inputted packet data to the succeeding stage and then for returning the transmission acknowledging signal AK20 or AK50 from the succeeding stage to the D-type flip-flop 720 or 750, that is, time required for handshaking transfer control.

The conflict avoiding portion 700 shown in FIG. 26B is further provided with a D type flip-flop 730, an NOR gate 731, a D-type flip-flop 760 and a NAND gate 761 in order to avoid conflict for each packet data comprising two words. In FIGS. 26A and 26B, 723, 753, 732 and 762 are delay elements.

Figure 28:
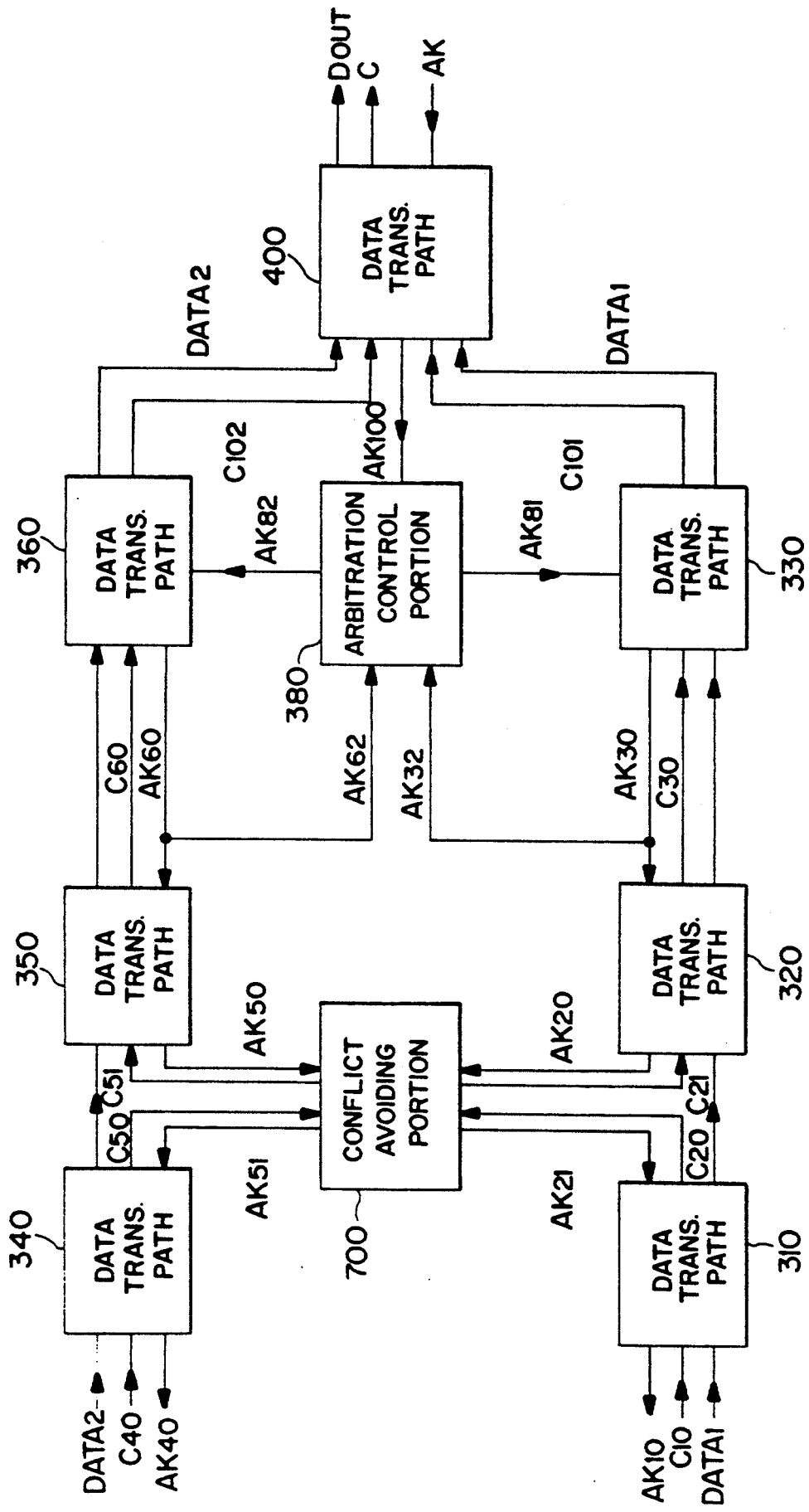
FIG. 28 is a block diagram showing a structure of a data transmission apparatus according to a sixth embodiment of the present invention.

FIG. 28 is a block diagram showing a structure of a data transmission apparatus according to a sixth embodiment of the present invention. This data transmission apparatus transmits packet data comprising one word. This data transmission apparatus differs from the data transmission apparatus of FIG. 24 in that the word number counting portion 800 is not required and the transmission acknowledging signals AK30 and AK60 from the data transmission path 330 and 360 are directly inputted to the arbitration control portion 380 as the transmission acknowledging signals AK32 and AK62, respectively. In addition, the conflict avoiding portion 700 employs the structure shown in FIG. 26A.

Figure 29:
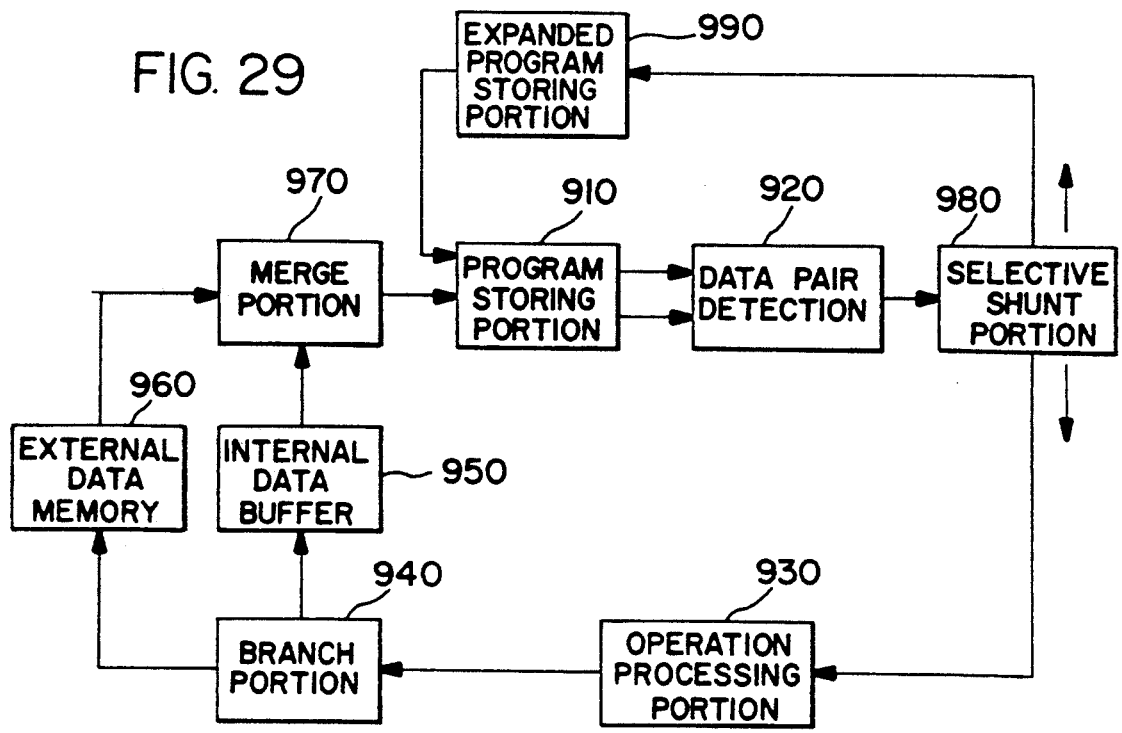
FIG. 29 is a block diagram showing a structure of a data flow type information processor to which the data transmission apparatus according to the present invention is applied.
Figure 30:
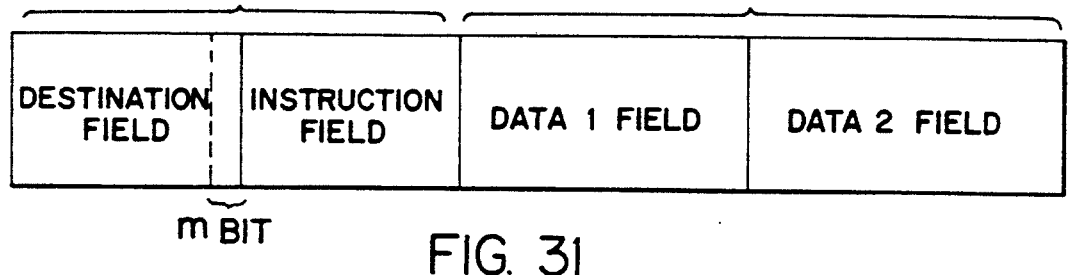
FIG. 30 is a diagram showing one example of a structure of a data packet circulating through respective portions in the data flow type information processor of FIG. 29.
Figure 31:
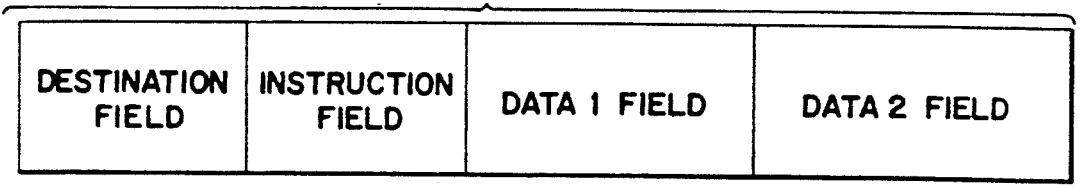
FIG. 31 is a diagram showing another example of a structure of a data packet circulating through the respective portions in the data flow type information processor of FIG. 29.

Data transmission apparatuses shown in FIGS. 2, 9, 23 and 28 are applied to, for example, a data flow type information processor. In addition, the interface apparatuses shown in FIGS. 15 and 18 are applied, for example, to data transmission between a plurality of data flow type information processors. FIG. 29 is a block diagram showing one example of a structure of a data flow type information processor. FIGS. 30 and 31 are diagrams showing examples of a field structure of data packet to be processed by the information processor. The data packet of FIG. 30 comprises two words and the data packet of FIG. 31 comprises one word.

Destination fields of the data packets shown in FIGS. 30 and 31 store destination information, instruction fields store instruction information and data 1 fields or data 2 fields store operand data. With respect to the data packet of FIG. 30, for example, the destination field and the instruction field correspond to the first word D1 shown in FIG. 3 and the data 1 field and the data 2 field correspond to the second word D2 shown in FIG. 3. The identifier of m bits shown in FIG. 3 is included in the destination information. A head bit of the first word D1 stores information "1" indicative of the first word and a head bit of the second word D2 stores information "0" indicative of the second word. (see FIGS. 10A and 10B).

Referring to FIGS. 29, 30 and 31, the structure and an operation of the data flow type information processor will be described.

Figure 32:
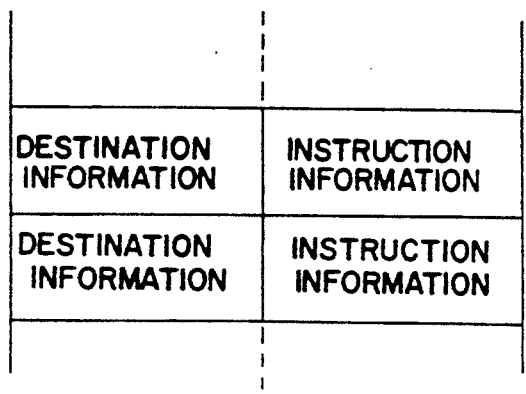
FIG. 32 is a diagram showing data flow program to be stored in a program storing portion of the data flow type information processor of FIG. 29.

In FIG. 29, a program storing portion 910 includes a program memory (not shown) and the program memory stores data flow program comprising a plurality of destination information and a plurality of instruction information, as shown in FIG. 32. The program storing portion 910 reads the destination information and the instruction information from the data flow program by addressing based on the destination information of a data packet, stores these information in the destination field and the instruction field of the data packet, respectively, and outputs the data packet.

A data pair detecting portion 920 queues the data packet outputted from the program storing portion 910. More specifically, the data pair detecting portion 920 detects two data packets having the same destination information, stores operand data of one data packet in a predetermined data field of the other data packet and outputs the other data packet. On this occasion, the above described one data packet disappears.

The data packet outputted from the data pair detecting portion 920 is transmitted to an operation processing portion 930 through a selective shunt portion 980 or transmitted to both an expanded program storing portion 990 and the operation processing portion 930 through the selective shunt portion 980. The operation processing portion 930 decodes the instruction information of the data packet outputted from the data pair detecting portion 920, subjects the two operand data to a designated operation processing, stores the result thereof in the data field of the data packet and outputs the data packet to a branch portion 940.

The branch portion 940 outputs a data packet to an internal data buffer 950 or an external data memory 960, based on destination information of the data packet. The data packets outputted from the internal data buffer 950 and the external data memory 960 are supplied to a merge portion 970 and the merge portion 970 supplies the data packets to the program storing portion 910 in the order of the arrival.

On the other hand, the expanded program storing portion 990 supplies the data packet supplied from the selective shunt portion 980 to the program storing portion 910.

In the data flow type information processor shown in FIG. 29, as the data packets circulate through the program storing portion 910, the data pair detecting portion 920, the selective shunt portion 980, the operation processing portion 930, the branch portion 940, the internal data buffer 950 or the external data memory 960 and the merge portion 970, an operation processing proceeds based on the program stored in the program storing portion 910. In addition, some of the data packets are transmitted from the data pair detecting portion 920 through the selective shunt portion 980 to the expanded program storing portion 990.

The data transmission apparatus of FIG. 2 can be used as the selective shunt portion 980 of the above described the data flow type information processor. The data transmission apparatus of FIG. 9 can be used as the branch portion 940 of that data flow type information processor. The interface apparatuses shown in FIGS. 15 and 18 are, for example, provided between a branch portion of one data flow type information processor and a merge portion of the other or a plurality of data flow type information processors. The data transmission apparatuses shown in FIGS. 23 and 28 can be used as the merge portion 970 of the above described data flow type information processor.

In case the expanded program storing portion 990 is not provided, the data pair detecting portion 920 is connected to the operation processing portion 930 through a data transmission path without the provision of the selective shunt portion 980.

The data transmission apparatus according to the present invention is not limited to a data flow type information processor and may be widely used for various types of information processors and other apparatuses requiring data transmission. In addition, the interface apparatus according to the present invention is not limited to be used for data transmission between data flow type information processors and can be widely used for data transmission between various type of information processors and that between other apparatuses.

What is claimed is:

1. A data transmission apparatus including a plurality of stages defining data transmission paths for transmitting packets of data supplied from a preceding stage to a plurality of succeeding stages provided in parallel, each of said packets of data including an identifier for designating at least one of said plurality of succeeding stages, said apparatus comprising:
   determining means for determining whether said identifier included in a packet of data supplied from said preceding stage designates said at least one of said plurality of succeeding stages and outputting a signal indicating the determination result, and
   controlling means operatively connected to said determining means responsive to said signal from said determining means for transmitting the packet of data supplied from said preceding stage to said at least one of said plurality of succeeding stages,
   wherein each of said packets of data comprises a plurality of words to be transmitted successively, and which apparatus further comprises word number counting means operatively connected to said controlling means for counting the number of words contained in a packet of data to be transmitted from said preceding stage to anyone of said plurality of succeeding stages to allow said controlling means to transmit the packet of data supplied from said preceding stage to said at least one of said plurality of succeeding stages until the plurality of words included in a packet of data is transmitted.

2. A data transmission apparatus including a plurality of stages defining data transmission paths for transmitting packets of data supplied from a preceding stage to a plurality of succeeding stages provided in parallel, each of said packets of data including an identifier for designating at least one of said plurality of succeeding stages, said apparatus comprising:
   determining means for determining whether said identifier included in a packet of data supplied from said preceding stage designates said at least one of said plurality of succeeding stages and outputting a signal indicating the determination result, and
   controlling means operatively connected to said determining means responsive to said signal from said determining means for transmitting the packet of data supplied from said preceding stage to said at least one of said plurality of succeeding stages,
   wherein each of said packets of data comprises a plurality of words to be transmitted successively, and which apparatus further comprises word number counting means operatively connected to said controlling means for counting the number of words contained in a packet of data to be transmitted from said preceding stage to anyone of said plurality of succeeding stages to allow said controlling means to transmit the packet of data supplied from said preceding stage to at least one of said plurality of succeeding stages until the plurality of words included in a packet of data is transmitted;
   said preceding stage including first data transmitting means for performing handshaking data transmission; and
   each of said plurality of succeeding stage portions including second data transmitting means for performing handshaking data transmission.

3. A data transmission apparatus according to claim 1, wherein
   said controlling means comprises cutting off means provided between said preceding stage and all of said plurality of succeeding stages and selectively becoming conductive or non-conductive in response to said signal outputted from said determining means.

4. A data transmission apparatus according to claim 1, wherein
   said determining means comprises comparing means for comparing said identifier with a predetermined signal to output a comparison result as said signal indicating the determination result.

5. A data transmission apparatus including a plurality of stages defining data transmission paths for transmitting packets of data comprising a plurality of words supplied from a preceding stage to at least one of a plurality of succeeding stages provided in parallel, at least one of said packets of data comprising a plurality of words including an identifier for designating any of said plurality of succeeding stages, said apparatus comprising:
   a plurality of determining means each provided corresponding to each of said plurality of words of said packets of data for determining a succeeding stage designated by the identifier and for outputting a signal indicating the determination result; and controlling means responsive to said signal from said determining means for sequentially transmitting said plurality of words included in a packet of data supplied from said preceding stage to at least one of said plurality of succeeding stages.

6. A data transmission apparatus according to claim 5, wherein
said preceding stage includes first data transmitting means for performing a handshaking data transmission,
each of said plurality of succeeding stages includes second data transmitting means for performing a handshaking data transmission.

7. A data transmission apparatus according to claim 5, wherein
said preceding stages includes a plurality of data transmitting means provided in series in correspondence to said plurality of words,
said plurality of determining means are provided in correspondence to said plurality of data transmitting means.

8. A data transmission apparatus according to claim 5, wherein
each of said plurality of determining means comprises comparing means for comparing the identifier included in a corresponding word with a predetermined signal and outputting the comparison result as said signal indicating the determination result.

9. A data transmission apparatus according to claim 5, wherein said controlling means comprises activation signal generating means responsive to said signal supplied from any of said plurality of determining means for generating an activation signal for activating any of said plurality of succeeding stages.

10. A data transmission apparatus according to claim 5, wherein each of said packets of data includes a plurality of words to be transmitted successively, and the apparatus further comprises word number counting means for counting the number of words to be transmitted from said preceding stage to at least one of said plurality of succeeding stages to allow said controlling means to transmit the packet of data supplied from said preceding stage to said at least one of said plurality of succeeding stages until the plurality of words included in a packet of data is transmitted.

11. A data flow information processor in which data is sequentially transmitted through a plurality of stages defining data transmission paths by means of data transmission apparatuses in accordance with a data flow program, at least one of said data transmission apparatuses transmitting packets of data comprising a plurality of words supplied from a preceding stage to at least one of a plurality of succeeding stages provided in parallel, any of said plurality of words in a packet of data including an identifier for designating at least one of the plurality of succeeding stages said at least one of data transmission apparatuses comprising:

a plurality of determining means each provided corresponding to each of said plurality of words in a packet of data for determining a succeeding stage designated by the identifier included in a corresponding word and for outputting a signal indicating the determination result, and controlling means responsive to said signal from said determining means for sequentially transmitting said plurality of words included in a packet of data supplied from said preceding stage to at least one of said plurality of succeeding stages.

12. An interface apparatus for controlling data transmission from a first apparatus to at least one of a plurality of second apparatuses, said first apparatus, which also receives data, outputting a transmission signal when it transmits data to said at least one of a plurality of second apparatuses, said at least one of said plurality of second apparatuses outputting a first reception completing signal when it completes data reception from said first apparatus, said interface apparatus comprising:

transmission inhibiting signal generating means responsive to said transmission signal from said first apparatus for supplying a transmission inhibiting signal for inhibiting additional data transmission by said first apparatus, and transmission acknowledging signal generating means responsive to the reception completing signal for generating a transmission acknowledging signal for authorizing additional data transmission in place of said transmission inhibiting signal when a final reception completing signal from said one or plurality of second apparatuses has been received.

13. An interface apparatus according to claim 12, wherein
said first apparatus comprises first data transmitting means for performing handshaking data transmission,
each of said at least one of second apparatuses comprising second data transmitting means for performing handshaking data transmission.

14. An interface apparatus for controlling data transmission from a first apparatus which also receives packet of data, to a plurality of second apparatuses,
said packet of data including an identifier for designating at least one of said plurality of second apparatuses, said first apparatus outputting a transmission signal when it transmits a packet of data to said at least one of a plurality of second apparatuses, each of said plurality of second apparatuses outputting a reception completing signal when it completes data reception from said first apparatus, said interface apparatus comprising:

determining means for determining whether said identifier included in the packets of data supplied from said first apparatus designates at least one of said plurality of second apparatuses and for outputting a signal indicating the determination result, controlling means responsive to said signal from said determining means for transmitting the packet of data supplied from said first apparatus to at least one of said plurality of second apparatus, transmission inhibiting signal generating means responsive to said transmission signal from said first apparatus for supplying a transmission inhibiting signal for inhibiting additional packets of data transmission by said first apparatus, and transmission acknowledging signal generating means responsive to a reception completing signal for generating a transmission acknowledging signal for authorizing additional data transmission in place of said transmission inhibiting signal when a reception completing signal from said at least one of a plurality of second apparatuses has been received.

15. An interface apparatus according to claim 14, wherein said first apparatus comprises first data transmitting means for performing handshaking data transmission, each of said plurality of second apparatuses comprises second data transmitting means for performing handshaking data transmission.

16. An interface apparatus according to claim 14, wherein said data comprises a plurality of words to be transmitted successively, the interface apparatus further comprising word number counting means for counting the number of words to be transmitted from said first apparatus to at least one of the second apparatuses to allow said controlling means to transmit the packets of data supplied from a preceding stage to at least one of a plurality of succeeding stages until a plurality of words included in a packet of data are transmitted.

17. An interface apparatus according to claim 16, wherein said controlling means comprises cutting off means provided between said first apparatus and at least one of said plurality of second apparatuses and selectively becoming conductive or non-conductive in response to said signal supplied from said determining means.

18. An interface apparatus provided between a plurality of data flow information processors in which data is sequentially transmitted through a plurality of processing stages in accordance with a data flow program; one of said information processors which receives data outputting a transmission signal when it transmits data to any other of said information processors, said any other of said information processors outputting reception completing signals when it completes data reception from said one information processor, said interface apparatus comprising:

transmission inhibiting signal generating means responsive to said transmission signal from said one information processor for supplying a transmission inhibiting signal for inhibiting additional data transmission by said one information processor, and transmission acknowledging signal generating means responsive to a reception completing signal generated from said any other of said information processors for generating a transmission acknowledging signal for authorizing additional data transmission in place of said transmission inhibiting signal when a reception completing signal has been received.

19. A data transmission apparatus for serially transmitting to a succeeding stage a plurality of packets of data supplied in parallel from preceding stages comprising:

a plurality of first data transmitting and receiving means each for receiving a plurality of packets of data supplied in parallel from said preceding stages to generate a transmission indicating signal, indicating arrival of a packet of data, second data transmitting means for generating a transmission acknowledging signal indicating that a packet of data can be received and for selectively receiving packets of data from at least one of said plurality of first data transmitting and receiving means, controlling means responsive to said transmission indicating signal generated from at least one of said plurality of first data transmitting and receiving means and said transmission acknowledging signal generated from said second data transmitting means for transmitting from said at least one of the plurality of first data transmitting and receiving means to said second data transmitting means information related to a sequence in which the packets of data were received.

20. A data transmission apparatus according to claim 19, wherein each of said plurality of first data transmitting means performs handshaking data transmission, said second data transmitting means performs handshaking data transmission.

21. A data transmission apparatus according to claim 19, wherein said second data transmitting means generates a transmission inhibiting signal in place of said transmission acknowledging signal while receiving data from said at least one of said plurality of first data transmitting means.

22. A data transmission apparatus according to claim 19, wherein each of said packets of data comprises a plurality of words to be transmitted successively, and the apparatus comprises word number counting means for counting the number of words transmitted from at least one of said plurality of first data transmitting means to said second data transmitting means to allow the said controlling means to transmit the plurality of words until the plurality of words in a packet of data are transmitted.

23. A data flow information processor in which data is sequentially transmitted through a plurality of processing stages by means of data transmission apparatuses in accordance with a data flow program at least one of said data transmission apparatuses serially sending the data supplied in parallel from a preceding stage said at least one of the data transmission apparatuses comprising:

a plurality of first data transmitting and receiving means each for receiving each of data supplied in parallel from said preceding stage to generate a transmission signal indicating arrival of the data, second data transmitting means for generating a transmission acknowledging signal indicating that the data can be received at said second data transmitting means and for selectively receiving the data from at least one of said plurality of first data transmitting and receiving means, controlling means responsive to said transmission signal generated from at least one said plurality of first data transmitting and receiving means and said transmission acknowledging signal generated by said second data transmitting means for transmitting information related to a sequence in which data was received.

* * * * *